United States Patent
Barkan et al.

(10) Patent No.: US 12,300,078 B1
(45) Date of Patent: May 13, 2025

(54) GATEWAY SCANNER

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/393,566

(22) Filed: Dec. 21, 2023

(51) Int. Cl.
*G07G 1/00* (2006.01)
*G06K 7/10* (2006.01)

(52) U.S. Cl.
CPC ....... *G07G 1/0045* (2013.01); *G06K 7/10871* (2013.01); *G06K 7/1096* (2013.01); *G06K 2007/10514* (2013.01)

(58) Field of Classification Search
CPC .... G06K 7/10; G06K 7/1096; G06K 7/10871; G06K 2007/10514; G07G 1/0045
See application file for complete search history.

(56) References Cited

U.S. PATENT DOCUMENTS

2013/0306727 A1* 11/2013 Shearin .................... G06K 7/10
235/440
2018/0314863 A1* 11/2018 Gao ...................... G06K 7/1456

* cited by examiner

*Primary Examiner* — Laura A Gudorf
(74) *Attorney, Agent, or Firm* — Yuri Astvatsaturov

(57) ABSTRACT

An imaged-based scanner includes a housing having a lower portion, an upper portion, and an extension arm extending upward from the lower portion to the upper portion. A lower portion includes a base having an exit window and an imaging assembly mounted in that base with at least one field of view directed upwardly through the exit window. The upper portion has imaging assembly that has at least two fields of view. That upper imaging assembly is mounted such that the two fields of view extend downwardly toward the lower portion with each field of view positioned to have a central axis that is offset with respect to a center normal of the exit window.

26 Claims, 22 Drawing Sheets

GATEWAY SCANNER

BACKGROUND

Retailers deploy self-checkout stations with increasing frequency to expedite customers purchase experience. Convention self-checkout is a multistage process. After a customer brings their cart to a station, the customer first reaches for an item, then locates a barcode on that item, orients and presents that barcode to a scanner (e.g., a bi-optic reader or handheld reader) ensuring that the item is registered as scanned, and finally places the item in a bag at a bagging area. Numerous self-checkout stations have been designed in the hopes of streamlining one or more of these steps through purported near frictional scanning experiences. For example, all-in-one stations with integrated, monitored bagging areas have been proposed, as have conveyor belt systems that attempt to automatically scan items moving across a scan field regardless of item orientation, as well as simultaneous scan stations that attempt to scan a collection of items all at once by sitting the items together under an imagers field. Not to mention, some have attempted complex shopping rooms that require a matrix of ceiling-mounted imagers continually scanning a room for items collected from shelves with the ideal goal of allowing customers to simply walk out of the shopping room and get automatically charged for the items they collected.

None of the conventional or proposed self-checkout stations prove a sufficiently frictionless solution that allows customers to reduce their scanning steps and that allows retailers to save valuable retail space at the checkout area.

SUMMARY

In an embodiment, the present invention is a scanner comprising: a housing having a lower portion, an upper portion, and an extension arm extending upward from the lower portion to the upper portion, the lower portion having an exit window and a lower imaging assembly mounted in the lower portion below the exit window and having at least one field of view directed upwardly through the exit window, and the upper portion having an upper imaging assembly mounted in the upper portion and having two fields of view, wherein the upper portion is configured such that the two fields of view extend downwardly toward the lower portion with each field of view positioned to have a central axis that is offset with respect to a center normal of the exit window.

In a variation of this embodiment, the upper portion comprises two branching arms extending in opposing lateral directions away from a center region where the upper portion is supported by the extension arm.

In another variation of this embodiment, the upper imaging assembly comprises a centrally positioned imager and wherein the two fields of view of the upper imaging assembly each extend from the centrally positioned imager into each branching arm respectively such that the two fields of view are offset from the center normal of the exit window by an equal and opposite offset distance. In a variation of this embodiment, the offset distance is greater than half a lateral width of the lower portion.

In another variation of this embodiment, the upper imaging assembly comprises two imagers each mounted in a respective one of the two branching arms such that the two fields of view of the upper imaging assembly are offset from the center normal of the exit window by an equal and opposite offset distance. In some examples, the offset distance is greater than half a lateral width of the lower portion.

In another variation of this embodiment, the upper portion is configured such that the two fields of view extend downwardly toward the lower portion which each central axis obliquely angled with respect to the center normal of the exit window, the two central axes being obliquely angled by equal and opposite angles.

In another variation of this embodiment, the upper imaging assembly comprises a centrally positioned imager, and wherein the two fields of view of the upper imaging assembly extend downwardly such that the two fields of view are offset from the center normal of the exit window by an equal and opposite offset distance.

In another variation of this embodiment, the upper imaging assembly comprises at least one wide-angle imager having a wide-angle field of view, and wherein the two fields of view of the upper imaging assembly correspond to portions of the wide-angle field of view. In a variation, the wide-angle field of view coincides with a lead-out region adjacent the scanner and/or a lead-in region adjacent to the scanner.

In another variation, the upper imaging assembly comprises two wide-angle imagers each having a respective wide-angle field of view, wherein one of the two wide-angle imagers is positioned such that its respective wide-angle field of view is to coincide with a lead-in region adjacent the scanner and wherein the other of the two wide-angle imagers is positioned such that its respective wide-angle field of view is to coincide with a lead-out region adjacent the scanner. In a variation, the upper portion comprises two branching arms extending in opposing lateral directions away from a center region where the upper portion is supported by the extension arm, and wherein each wide-angle imager is mounted in a respective one of the two branching arms.

In a variation, a ratio of a vertical height of the scanner to a lateral width of the scanner is at least 2:1. In another variation, the lateral width of the scanner is between 7 inches and 12 inches, and preferably no more than 10 inches. In another variation, the vertical height of the scanner is between 15 inches and 30 inches.

In another variation of this embodiment, the scanner comprises a display screen mounted to the extension arm or mounted to the upper portion.

In another variation of this embodiment, the lower portion further comprises a weigh platter positioned to weight items resting on the exit window.

In another variation of this embodiment, the exit window is recessed in the lower portion.

In another variation of this embodiment, the lower portion includes one or more adjustable extension wings, at least one of which extends toward a lead-in region adjacent the scanner or toward a lead-out region adjacent the scanner.

In another variation of this embodiment, the lower imaging assembly comprises a plurality of imagers each having a respective field of view directed upwardly through the exit window.

In another variation of this embodiment, the scanner comprises a hinge in the extension arm, the hinge being configured to rotate an upper portion of the extension arm such that the upper portion of the scanner is placed into a stored position adjacent to the lower portion of the scanner.

In another embodiment, the present invention is a scanning station for a retail environment, the scanning station comprising: a lead-in region for positioning objects prior to scanning and a lead-out region for storing objects after scanning; a scanner positioned between the lead-in region and the lead-out region for scanning objects received from the lead-in region, the scanner comprising, a housing having a lower portion, an upper portion, and an extension arm extending upward from the lower portion to the upper portion, the lower portion having an exit window and a lower imaging assembly mounted in the lower portion below the exit window and having at least one field of view directed upwardly through the exit window, the upper portion having an upper imaging assembly mounted in the upper portion and having two fields of view, wherein the upper portion is configured such that the two fields of view extend downwardly toward the lower portion with each field of view positioned to have a central axis that is offset with respect to a center normal of the exit window; a display screen; and a transaction input terminal integrated with the scanner or mounted to the scanner to allow a user to input transaction related information.

In a variation of this embodiment, the scanning station further comprises a printer integrated with the scanner or mounted to the scanner to generate scan related media into a user area.

In a variation of this embodiment, the scanning station further comprises a mount at the lower portion configured to accept a handheld scanner and to position the handheld scanner such that a field of view of the handheld scanner overlaps the at least one field of view directed upwardly through the exit window.

In a variation of this embodiment, the lead-in region is a shopping cart area.

In a variation of this embodiment, the lead-in region is a conveyor belt assembly configured to move objects toward the scanner.

In a variation of this embodiment, the lead-out region is a bagging area.

In another embodiment, a scanner includes: a housing having a lower portion, an upper portion, and an extension arm extending upward from the lower portion to the upper portion, and the upper portion having an upper imaging assembly mounted in the upper portion, the upper imaging assembly having two wide-angle fields of view, with a first wide-angle field of view directed to extend over a lead-in region adjacent the scanner and a second wide-angle field of view directed extend over a lead-out region adjacent the scanner, and wherein the first wide-angle field view and the second wide-angle field view overlap each other to define, with the at least one field of view directed upwardly, a scan region above the exit window.

In yet another embodiment, a scanner includes: a housing having a lower portion, an upper portion, and an extension arm extending upward from the lower portion to the upper portion; the lower portion having an exit window and a lower imaging assembly mounted in the lower portion below the exit window and having at least one field of view directed upwardly through the exit window, each of the least one field of view directed upwardly through the exit window having a central axis that forms an angle with a normal to the exit window; the upper portion having a plurality of imagers mounted in the upper portion, each of the plurality of imagers having a field of view (i) extending downwardly toward the lower portion and (ii) having a field of view central axis that forms an angle with the normal to the exit window; wherein the upper portion positions the plurality of imagers such that each imager is positioned to have a central imager axis that forms a right angle with the exit window, such that each imager is positioned between outer edges of the exit window when viewed in plan view from above.

In yet another embodiment, a scanner includes: a housing having a lower portion, an upper portion, and an extension arm extending upward from the lower portion to the upper portion; the lower portion having an exit window and a lower imaging assembly mounted in the lower portion below the exit window and having at least one field of view directed upwardly through the exit window, each of the least one field of view directed upwardly through the exit window having a central axis that forms an angle with a normal to the exit window; the upper portion having a plurality of imagers each of the plurality of imagers having a field of view (i) extending downwardly toward the lower portion and (ii) having a field of view central axis that forms an angle with the normal to the exit window; and wherein the upper portion positions the plurality of imagers such that each imager is positioned, such that each imager is positioned between outer edges of the exit window when viewed in plan view from above.

In another variation, a scanner includes: a housing having a lower portion, an upper portion, and an extension arm extending upward from the lower portion to the upper portion; the lower portion having an exit window and a lower imaging assembly mounted in the lower portion below the exit window and having at least one field of view directed upwardly through the exit window, each of the least one field of view directed upwardly through the exit window having a central axis that forms an angle with a normal to the exit window; the upper portion having a plurality of imagers each of the plurality of imagers having a field of view (i) extending downwardly toward the lower portion and (ii) having a field of view central axis that forms an angle with the normal to the exit window; and wherein the upper portion positions the plurality of imagers such that each imager is distal of the exit window such that a central imager axis of the imager forms an oblique angle with the exit window, and such that each imager is positioned distally of outer edges of the exit window when viewed in plan view from above.

In another variation, a scanner includes: a plurality of imaging assemblies, each having a field of view; and a housing mounting the plurality of imaging assemblies so that each field of view overlaps with at least one other of the fields of view such that all fields of view collectively form a scan volume capable of scanning an object over approximately 360° of rotational freedom, wherein the housing has a lower portion, an upper portion, and an extension arm extending upward from the lower portion to the upper portion, and wherein at least one of the plurality of imaging assemblies is mounted in the upper portion and at least one other of the plurality of imaging assemblies is mounted in the lower portion, and wherein the housing is shaped to form an arc of approximately 180° about the scan volume to provide a user free access to scan objects by passing the objects through the scan volume.

In another variation, a scanning station for effecting a transaction in a retail environment includes: a lead-in region for positioning a shopping cart of objects prior to scanning and a lead-out region for storing objects after scanning; a substantially horizontal scanning surface extending fully between an edge of the lead-in region and an edge of the lead-out region; a scanner positioned between the lead-in region and the lead-out region for scanning the objects from the shopping cart received from the lead-in region, the scanner defining greater than approximately 75% of the substantially horizontal scanning surface, the scanner comprising, a plurality of imaging assemblies, each having a field of view, and a housing mounting the plurality of imaging assemblies so that each field of view overlaps with at least one other of the fields of view such that all fields of view collectively form a scan volume capable of scanning an object over approximately 360° of rotational freedom, wherein the housing has a lower portion, an upper portion, and an extension arm extending upward from the lower portion to the upper portion, and wherein at least one of the plurality of imaging assemblies is mounted in the upper portion with a downwardly extending field of view and at least one other of the plurality of imaging assemblies is mounted in the lower portion with an upwardly extending field of view, and a display screen; and a detection assembly positioned relative to the substantially horizontal scanning surface to detect that the shopping cart is in a correct location in the lead-in region for effecting the transaction.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
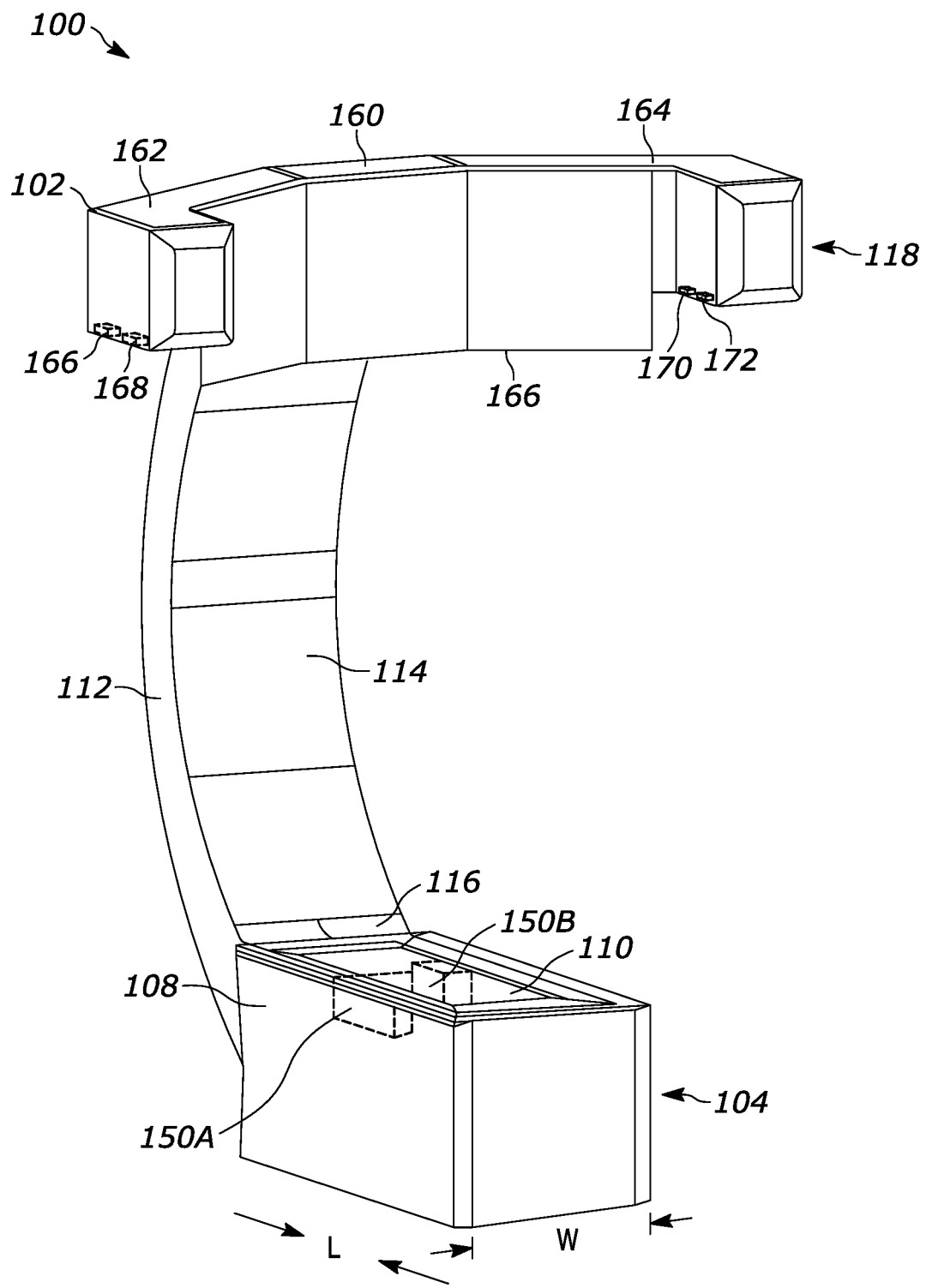
FIGS. 1A and 1B illustrate perspective views of a gateway scanner with two branching arms.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, scanners are provided that have a scan surface, multiple imagers with overlapping fields of view over that scan surface, including one or more upwardly directed imagers and one or more downwardly directed imagers. The upwardly directed imagers are in lower portion of the scanner and the downwardly directed imagers are in an upper portion, where the bottom and upper portions are connected via an integrated extension arm. In various examples, these scanners provide an integrated, narrow profile scanner design that is of sufficiently small form factor to allow for displaced between a shopping cart area and a bagging area, such that a customer can quickly scan items from one area to the other, in a frictionless manner, without concern for orientation of the time, as the multiple imagers in the integrated design are positioned to detect barcodes on an item regardless of the items orientation. In various examples, the extension arm not only extends upward to support the upper portion of the scanner, the extension arm may be shaped to provide a scanning tunnel through which a user can scan and item ensuring that that item is within a scan volume and without the support structure impending the scanning motion. While examples are described herein with an extension arm, for example, one that may be integrally formed into a lower portion and an upper portion, any of the examples herein may include an external support, such as an external wall or wall mountable support. And further, these external supports may be integrally formed into the lower and upper portions, through dedicated connector assemblies.

Thus, advantageously scanners herein offer an integrated design of relatively narrow width that can sit between a shopping cart area and a bagging area and may be referred to herein as "gateway" scanners. As a gateway scanner, these designs provide a scan region that is not dependent upon the orientation of an object, but rather can scan indicia on an item irrespective of the orientation of the object during scanning or location of that indicia on the object. This independence may result from the upwardly directed and/or downwardly directed nature of various imagers having respective fields of view that overlap above a scan surface. In particular, in various examples, the upwardly directed and/or downwardly directed imagers may have fields of view that have a central axis that is offset with respect to a center normal extending upward from an exit window of a lower portion of the scanner. In some examples, those fields of view have a central axis that is obliquely angled with respect to that center normal. Additionally, the independence may result from fields of view that are directedly upwardly and/or downwardly and that any of which may additionally have a forward, backward, leftward, or rightward bias.

Further, as a gateway scanner, various examples herein can include wide angle fields of view that may extend partially or fully into one or both the shopping cart area and the bagging area. Thus, in some examples, gateway scanners are provided that can image the shopping cart and bagging areas to capture image data that can be further used in self-checkout scanning operations, in addition to the image data capture over the scan region between those two areas.

In various examples scanners are provided that include a housing with a lower portion, an upper portion, and an extension arm extending upward from the lower portion to the upper portion. That extension arm can have varying shapes, but preferably a shape that at least partially defines a region for scanning items between the lower portion and the upper portion. The lower portion may have an exit window and a lower imaging assembly mounted in the lower portion below that exit window. That imaging assembly may be characterized by having one or more fields of view directed upwardly through the exit window. Correspondingly, the upper portion may have an upper imaging assembly that has two fields of view that extend downwardly toward the lower portion with each having a central axis offset from (and in some examples obliquely angled) with respect to a center normal extending upward from the exit window. That offset may be equal and opposite in distance. In examples where the central axis is obliquely angled those angles may be equal and opposite. In some examples, the lower imaging assembly has two fields of view that extend upwardly toward the upper portion with each having a central axis obliquely angled with respect to a normal extending upwardly from the exit window and with each extending upwardly along different oblique angles. The upper portion may be a unitary structure, for example, one formed of a single-mold frame structure.

In various examples, the scanners here may be implemented in a scanning station, for example, in a retail environment. As discussed below, in some examples, a scanning station includes a lead-in region for positioning objects prior to scanning and a lead-out region for storing objects after scanning. A gateway scanner is positioned between the lead-in region and the lead-out region for scanning objects received from the lead-in region. The scanning station further includes a display screen that may be separate from or integrated with the scanner. The scanning station further includes a transaction input terminal that may be integrated with the scanner or mounted to the scanner to allow a user to input transaction related information. As further discussed, the extension arm may include window and forward-looking imaging assembly sized appropriately to further define a scan region. In other examples, the extension arm may include a feature, label, light, or other indicator that identifies the location the scan region for the user.

Figure 1B:
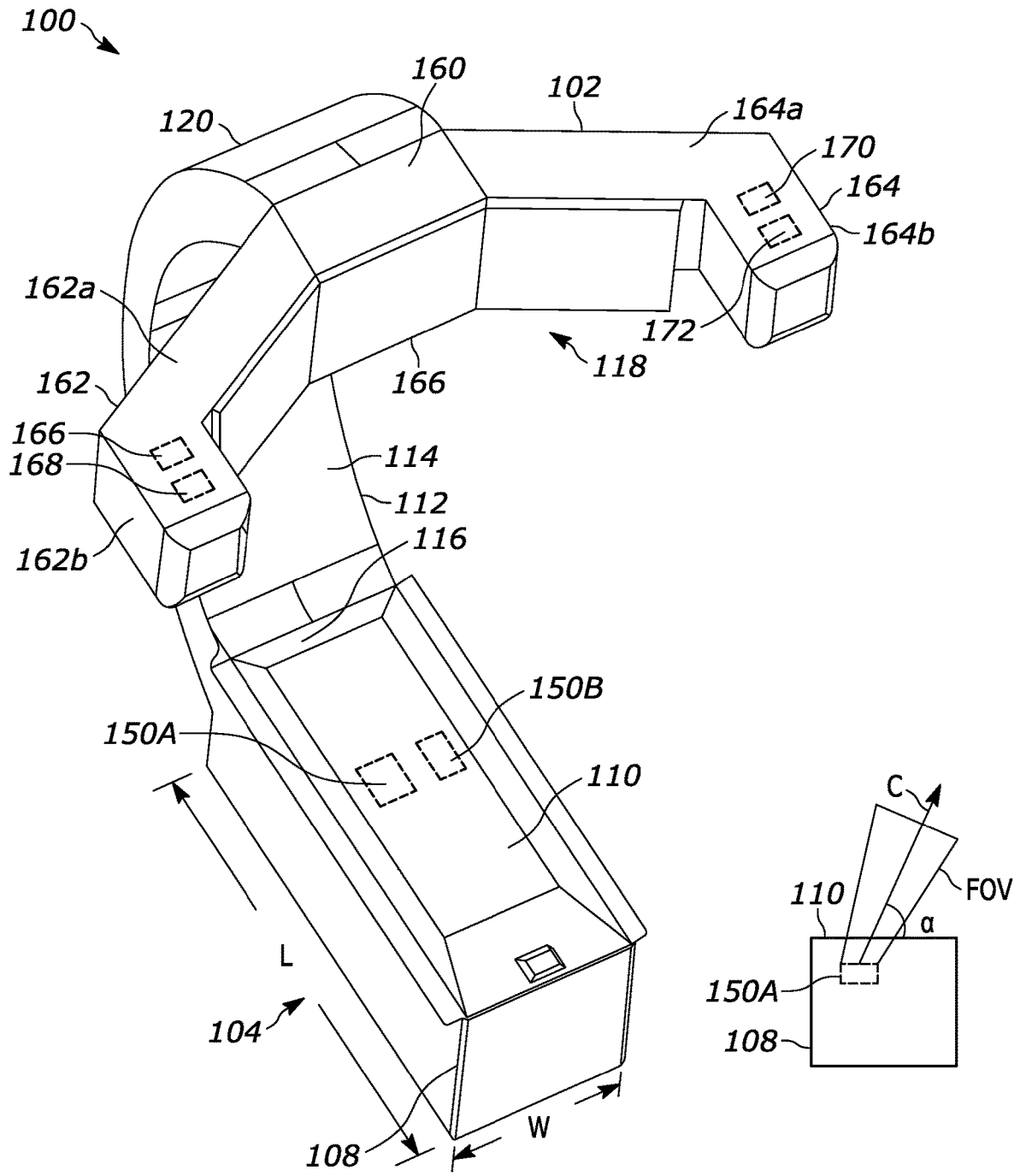

As shown in FIGS. 1A and 1B, a scanner 100 with a narrow-profile integrated design is shown. The scanner 100 includes a housing 102 having a lower portion 104 that defines a bottom extent of a scan region 106. The lower portion 104, in the illustrated example, has bottom frame 108 in which an opening is formed for placement of a transparent exit window 110, formed of a scratch resistance glass, for example. An upper surface of that exit window 110 provides a scan surface. A user scans an object by moving it from one side of the scan region 106 above the window to the other side of the scan region 106. In the illustrated example, the scan region 106 may be a narrow scan region. For example, the scan region 106 may be limited in width to the width, W, of the bottom frame 108. In some examples, the scan region 106 may be larger than this width, W, or smaller than this width, W. This lateral width, W, may be between 7 inches and 12 inches in some examples, and preferably no more than 10 inches. To maintain the narrow-profile, in some examples, a ratio of a vertical height, H, of the scanner to a lateral width of the scanner is at least 2:1. In some examples, the vertical height, H, is between 15 inches and 30 inches, for example.

The exit window 110 can further provide a placement surface upon which objects to be scanned may be placed, for example, when the bottom frame 108 includes an integrated weigh platter, as discussed in various examples herein.

As shown in FIGS. 1A and 1B, an extension arm 112 extends upward from the bottom frame 108 and is characterized, at least in the illustrated example, by having an arcuate side profile that can be sized to allow the scan region 106 to extend the full length of the exit window 110, the full length, L, of the bottom frame 108, or to extend a greater length than the full length, L. For example, the extension arm 112 may have an arcuate inner wall surface 114 that extends from a distal end 116 of the bottom frame 108 at the lower portion 104 of scanner 100 to an upper portion 118 of the scanner 100 where a mounting structure is provided for downwardly directing one or more imagers. The arcuate wall surface 114 may have a radius selected based on the size of the scan region desired, the amount of clearance desired for moving an object across a scan region (for example, for scanning objects that are larger than a scan region), or a radius determined from other factors, such as the desired height of the upper portion 118. In some examples, the extension arm 112 has as arcuate outer wall surface 120 in addition to the arcuate inner wall surface 114. However, in other examples, the outer wall surface 120 may have a flat or other profile. Similarly, the inner wall surface 114 may have a flat or other profile in other examples.

In the illustrated example, the bottom frame 108 houses one or more upwardly directed imagers 150A and 150B (where two are shown) that each have a field of view extending upwardly through the exit window 110. For example, the one or more imagers 150A/150B may have fields of view that extend vertically or substantially vertically through the exit window to coincide with the scan region 106. As used herein substantially vertically includes any field of view having a central axis, C, that forms an angle, a, with the horizontal plane of the exit window 110 that is at least 10°, from a side view, where 90° refers to absolute vertical. In other examples, the angle is from 10° up to but excluding 90°, or more preferably from 20° up to but excluding 90, or more preferably still from 30° up to but excluding 90°. Example resulting fields of view are shown in FIGS. 3A-3D, discussed further below.

In the illustrated example, the scanner 100 includes at the upper portion 118, a branching mount 160 integrated with the extension arm 112 and having two branching arms 162 and 164, each extending in opposing lateral directions away from a center region where the upper portion 118 is supported by the extension arm 112. In the illustrated example, the mount 160 includes an upper support frame 160 that rigidly supports each of the branching arms 162, 164 to the extension arm 112. The branching arms 162, 164 are multi-segment arms in the illustrated example, although any suitable configuration may be achieved. The branching arm 162 includes a first segment 162A that is deflecting in a horizontal direction but with an inward pitch formed by a pitch angle, where that first segment 162A terminates at second segment 162B that provides a mount for one or more downwardly directed imagers. In this way, the branching arm 162 mounts its one or more downwardly directed imagers at a lead-out side of the scanner 100, for example, extending over a portion or a bagging area or at least over a lead-out region adjacent a bagging area. Similarly, the branching arm 164 includes segments 164A and 164B having the same orientation but where the one or more downwardly directed imagers are at a lead-in side of the scanner 100, for example, extending over a portion of shopping cart area or at least over a lead-in region adjacent that shopping cart area. That is, the examples show downwardly directed imagers are positioned outside (whether distally, proximally, or laterally) of outer edges of the exit window 110 when viewed in a plan view from above (see, e.g., FIG. 4C) or front view (see, e.g., FIG. 4A). In the illustrated example, these downwardly directed imagers are positioned outside of outer boundaries of the entire lower portion 104 of the housing 102 when viewed in a plan view from above.

In the illustrated example, each of the segments 162B and 164B mount one or more imagers. In the illustrated example, the imaging assembly of the scanner 100 includes two imagers 166/168 mounted in segment 162B and two imagers 170/172 are mounted in segment 124B. Alternatively, in other examples, the imaging assembly of the scanner 100 includes only one imager 166 mounted in the segment 162B and the other imager 170 mounted in the segment 162B. Furthermore, each of these imagers, i.e., imagers 166 and 170 in the single imager example or imagers 166/168 and 170/172 in the dual imager examples (as shown in FIGS. 3A-3D), are mounted in the upper portion such that their respective fields of view extend downwardly toward the lower portion 104 with each respective field of view having a central axis that is offset with respect to a center normal of the exit window 110 in the lower portion 104. In some examples, the upper portion 118 is configured such that the imagers 166/168 and 170/172 directedly downwardly and biased in the direction of a user positioned for scanning objects using the scanner 100. In some examples, the upper portion 118 is configured such that an upper imaging assembly has one or more imagers mounted in each branching arms 162/164 and such that their fields of view are offset from the center normal of the exit window by an equal and opposite offset distance. In some examples, that offset distance is greater than half a lateral width of the lower portion 104. In some examples, the upper portion 118 is configured such that the fields of view extend downwardly toward the lower portion 104, which each field of view central axis obliquely angled with respect to the center normal of the exit window, e.g., obliquely angled by equal and opposite angles.

Figure 2:
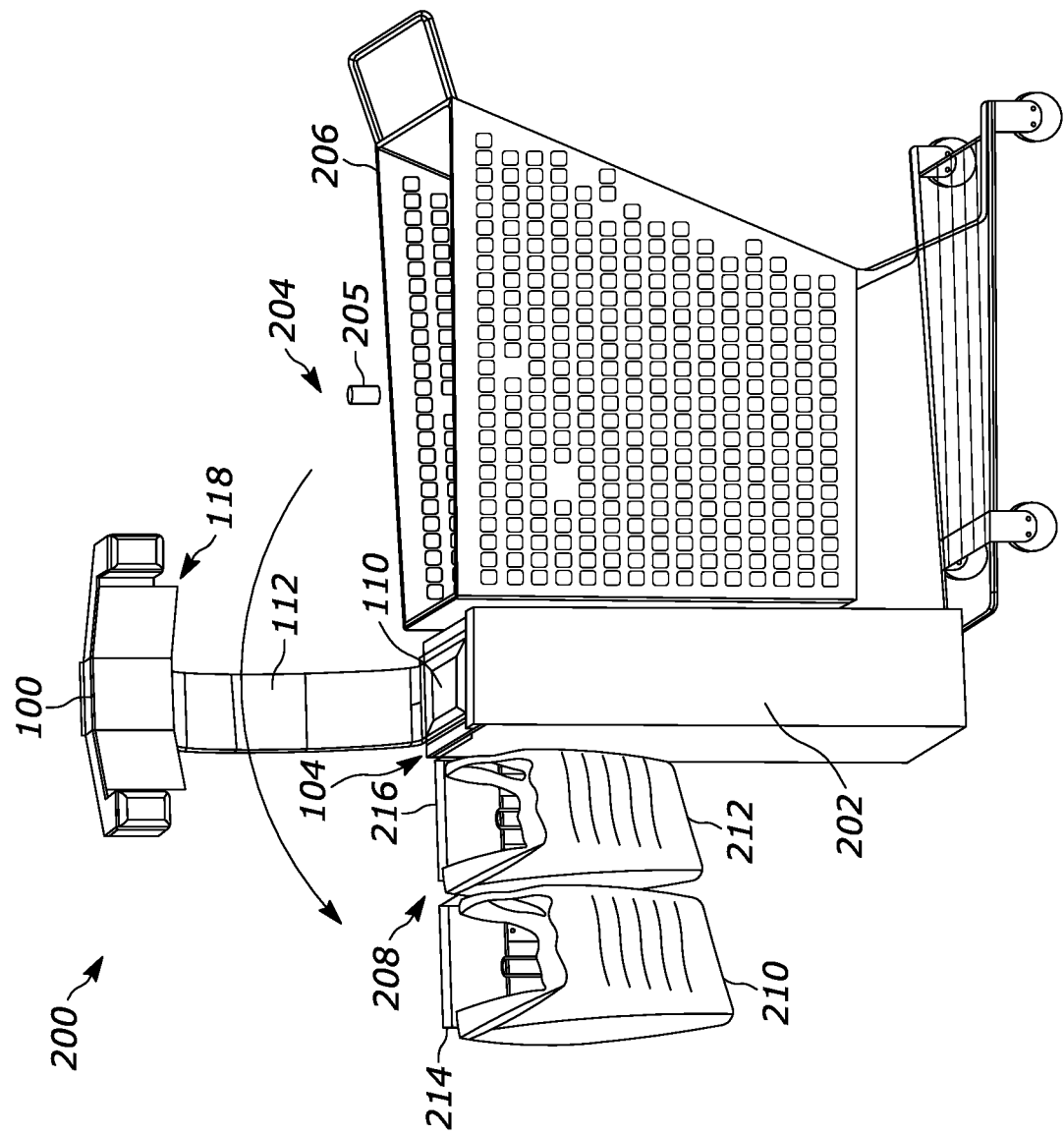
FIG. 2 illustrates a perspective view of the gateway scanner of FIGS. 1A and 1B in self-checkout location of a retail environment.

FIG. 2 illustrates the scanner 100 positioned in self-checkout location 200 of a retail environment. The bottom frame 108 of the scanner 100 is mounted in a support structure 202 that extends from a floor and that resulting positions the scanner 100 between (i) a lead-in region in the form of a shopping cart area 204 shown having a shopping cart 206 and (ii) lead-out region in the form of a bagging area 208 shown with bags 210/212 mounted to bagging frames 214/216, respectively. A general direction of movement of an object 205 from the area 204 to the area 208 is shown, although the scanner 100 may be agnostic to the direction of movement from one area to the other, allowing scanning of an object regardless of direction of movement across a scan region.

FIG. 2 (along with FIG. 5 and other figures) illustrates a feature of any of the various examples wherein, namely that the narrow width of a scanner combined with the positioning of the lead-in region and the lead-out region allows for the most natural movement and lowest effort between the two, thereby encouraging users to follow a natural path through the scan region. Also, a narrow scanner can be sized such that there is not any place to put items down on the scanner, which encourages users to pick up an item right out of the shopping cart and immediately scan it and place in a bag, without adding a step in the middle of scanning such as putting an item down. Removing that step can help avoid accidental scans of items left near a scanner and also can help ensure that those items are all in appropriate positions to be monitored by externa vision systems or personnel.

FIGS. 3A-3D illustrate example fields of a view of different imagers in the scanner 100. Imagers 170/172 have corresponding fields of view 220/222 that are downwardly directed. The FsOV 220/222 may have central axes, C, having a origin point that is laterally offset by a distance, λ, from a center normal axis, D, of the exit window 110. In some examples, the FsOV 220/222 are downwardly directed toward that center normal axis, D, at an oblique angle, B, with respect to that center normal axis to overlap with the scan region 106. Correspondingly, the imagers 166/168 have corresponding FsOV 224/226 that may have central axes that are laterally offset from the center normal axis, D, of the exit window 110. In some examples, the FsOV 224/226 are downwardly directed toward that center normal axis, D, at an oblique angle.

While illustrated in some examples, the downwardly directed FsOV of scanners in accordance with the present teachings may result from many different combinations of imagers and FsOV so long as adequate image resolution and coverage is provided to fully cover the lower portion of the housing and to decode indicia at any upward-facing orientation before that indicia is identified by any upward-looking FsOV emanating from the lower portion. Further, in various examples, any combination of different FsOV emanating from the scanner could be used to overlap to define scan region while providing angular coverage adequate to ensure that an indicia is identifiable and scannable on any of the 6 sides of a rectangular-shaped object oriented in any direction, thus the indication of 360° in the examples of FIGS. 4A-4C.

In the illustrated example, the imagers 170/172 define a first edge plane of the scan region, and the FsOV 224/226 may each define a second edge plane of the scan region. These first and second edge planes can define first and second outer extents of the scan region 106, for example. In the illustrated example, the branching arms 162, 164 position respective imagers to generate angled first and second edge planes, as measured against a vertical plane. Angled edge planes may be desired to provide a more confined scan region 106. The exact angle may be determined by the shape of the branching arms 162, 164, such as how far away they extend from the extension arm 112. Of course, in some examples, the orientation of the respective fields of view of the imagers in the branching arms 162, 164 may be determined from internal optics of the imagers, apertures of the imagers, or other confinement techniques. The fields of view 220/222/224/226 allow for scanning an object from the left side, the right side, and from the top.

Figure 3A:
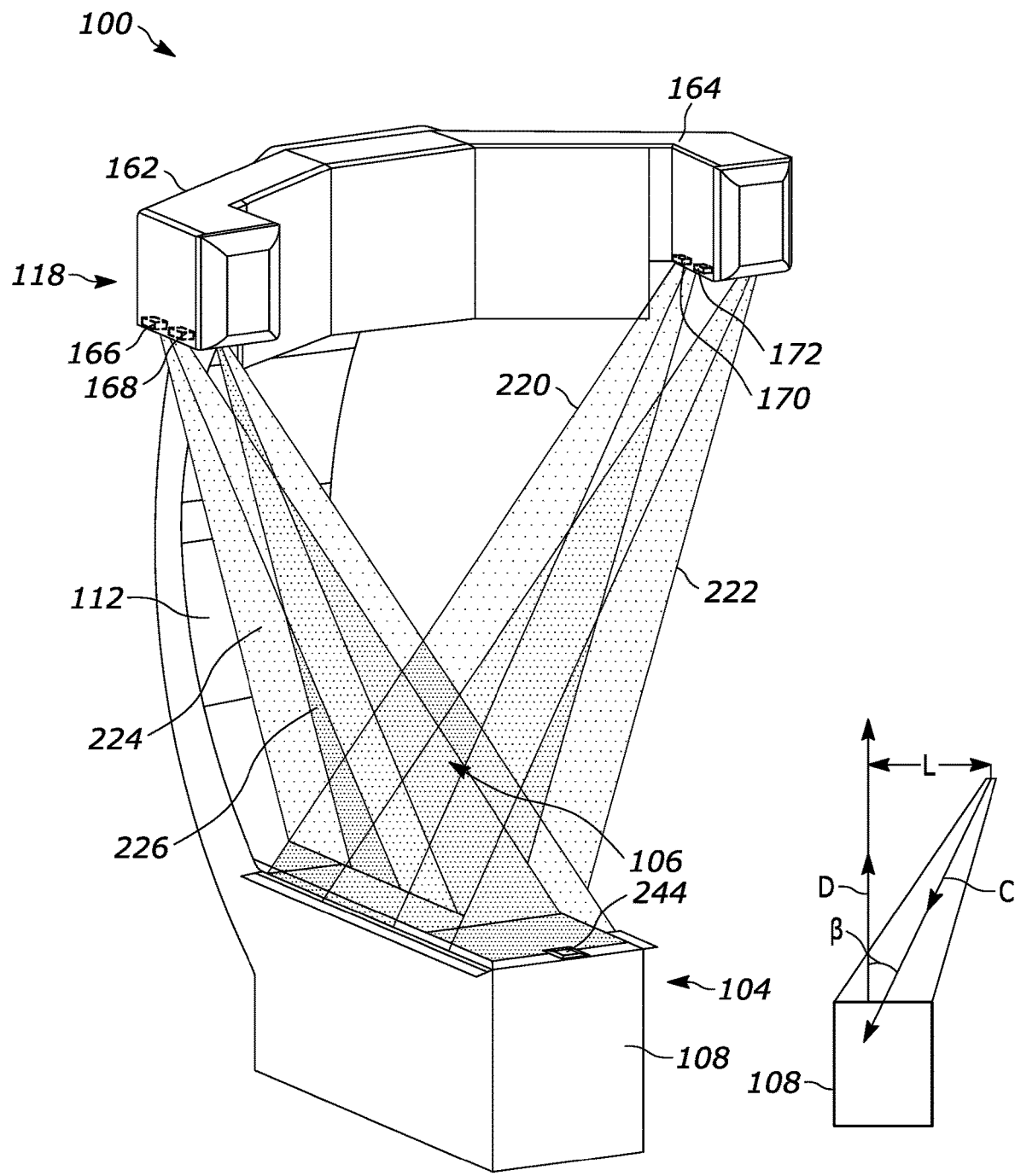
FIGS. 3A, 3B, 3C, and 3D are different perspective views of the gateway scanner of FIGS. 1A and 1B illustrating different imager fields of view.
Figure 3B:
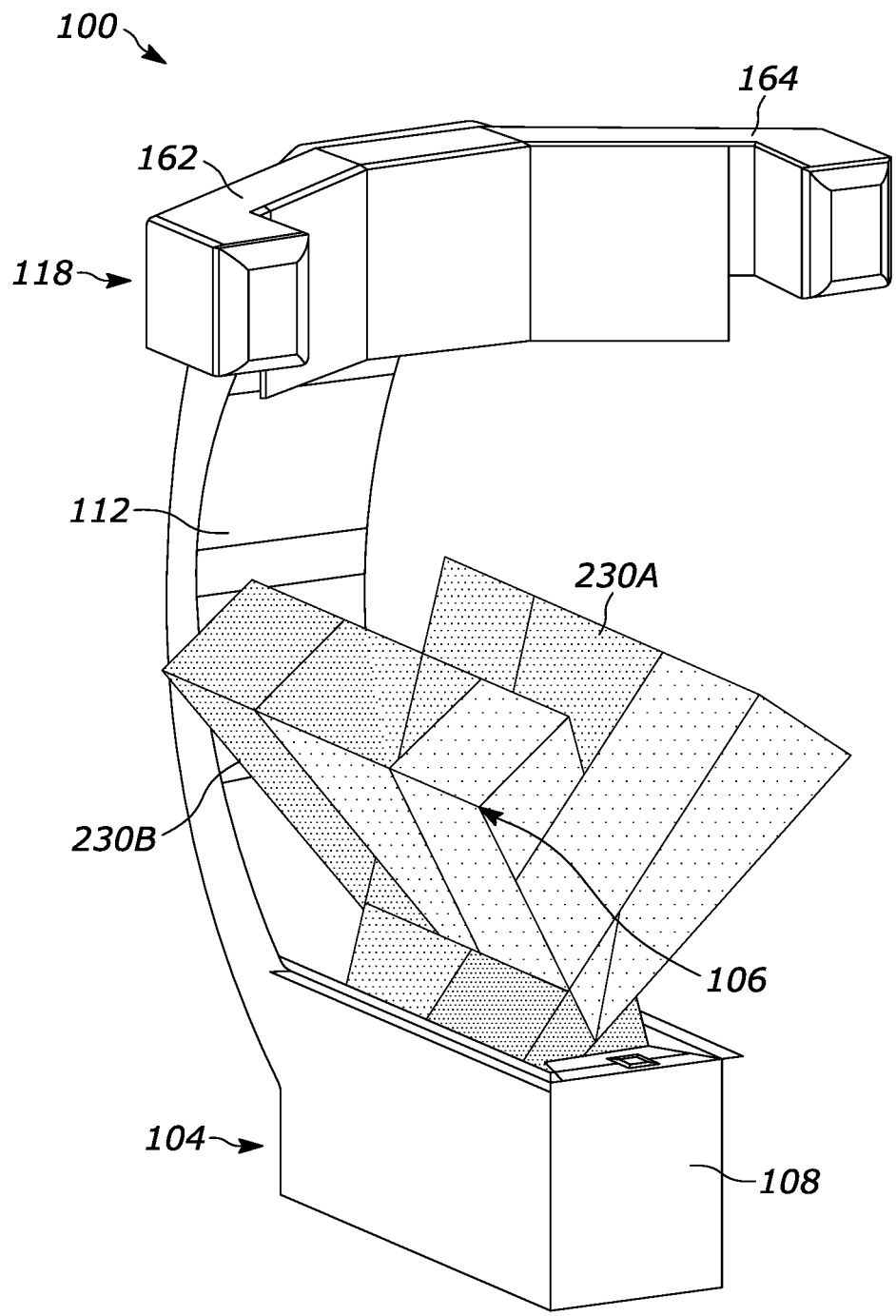

FIG. 3B illustrates fields of view 230A and 230B corresponding to upwardly directed imagers 150A and 150B in the bottom frame 108. In the illustrated example, the imagers 150A/150B are mounted such that their corresponding fields of view 230A/230B are angled relative a vertical plane, that is, a center axis of the field of view forms an acute angle with the vertical plane. The fields of view 230A/230B allow for scanning an object from the left side, the right side, and from the bottom. As shown in FIG. 3D, the scan region 106 coincides with a scan volume defined by these fields of view 220/222/224/226/150A/150B.

Figure 3C:
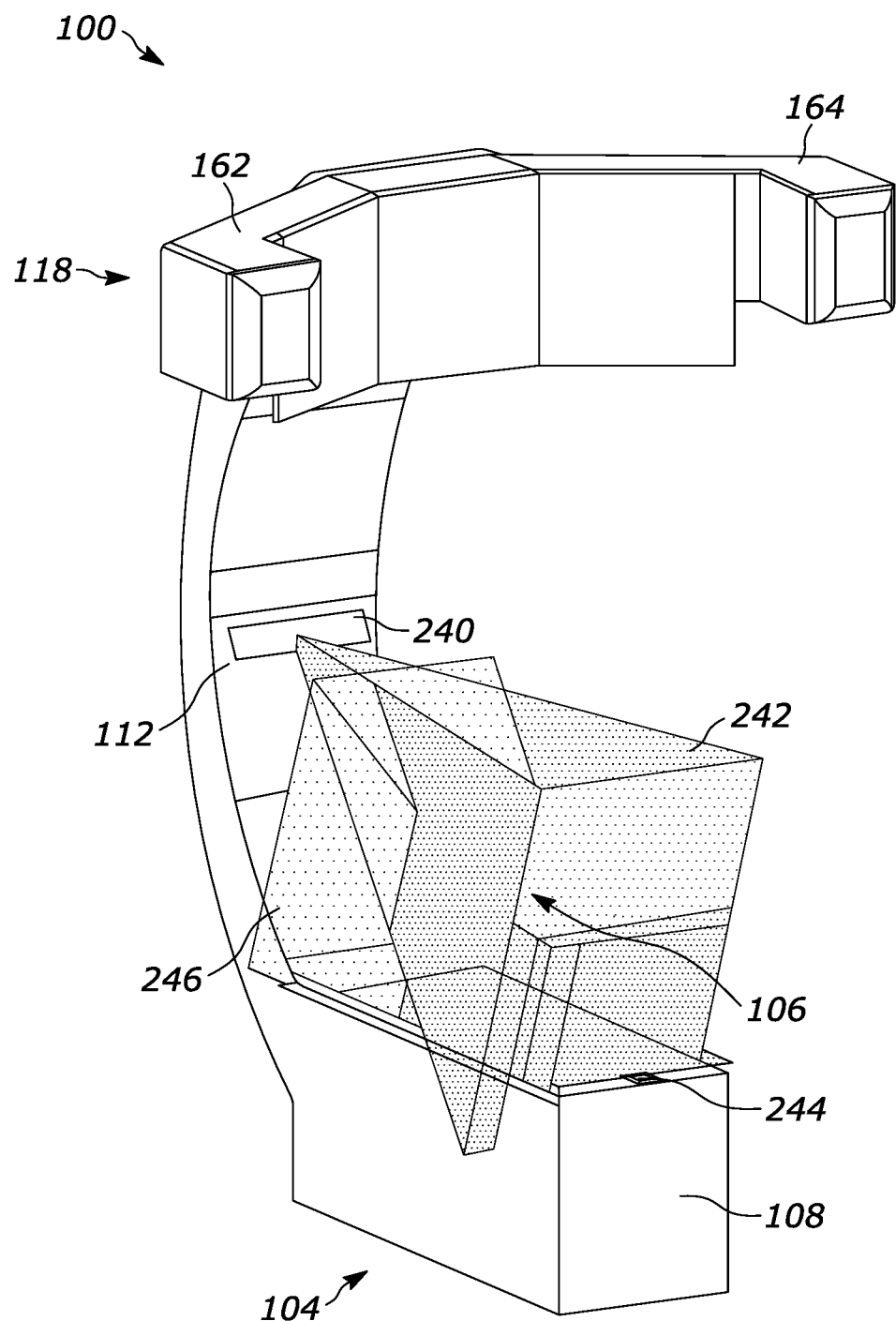
Figure 3D:
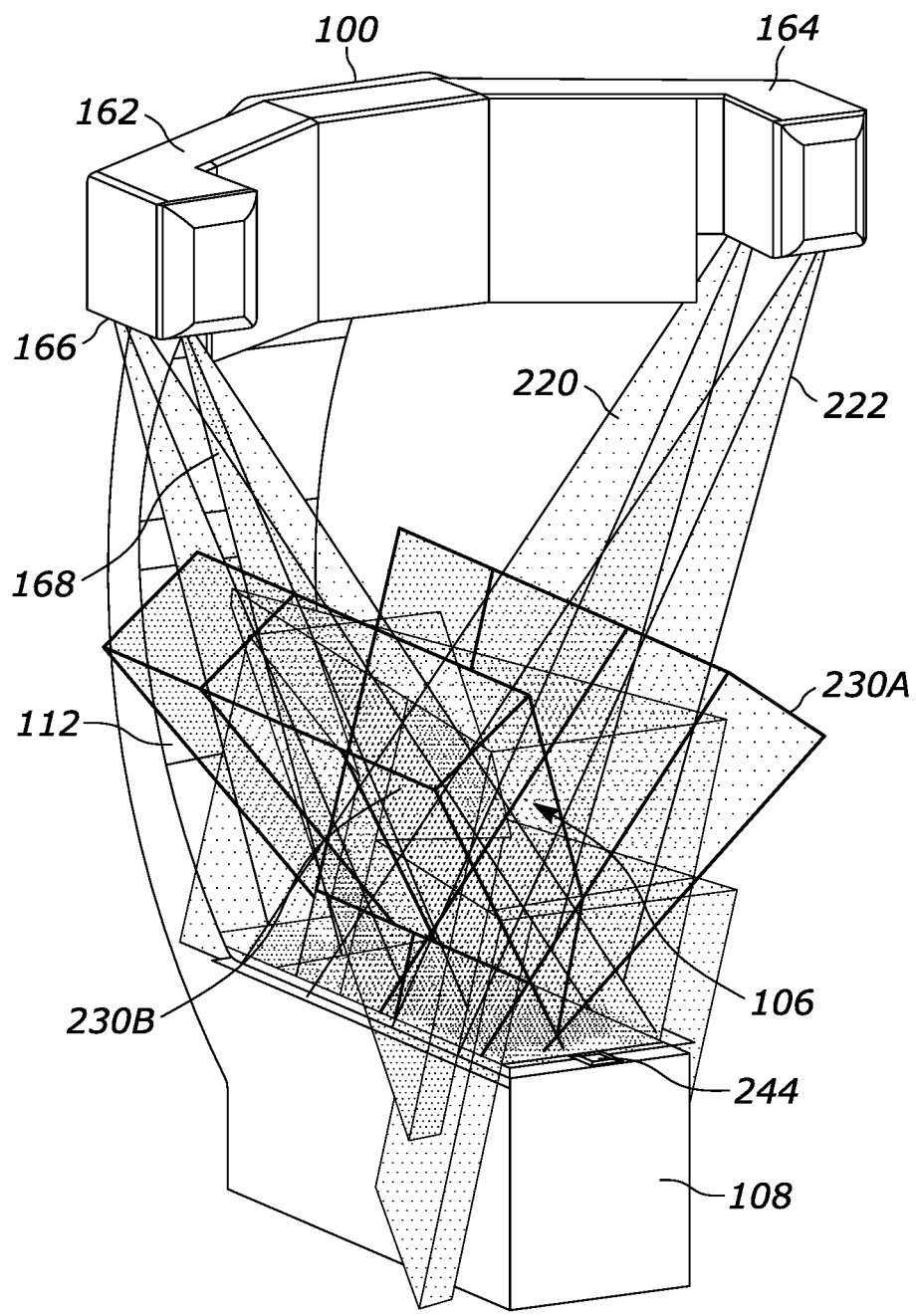

FIG. 3C illustrates an example of the scanner 100, in which an additional (and optional) front directed imager 240 is positioned in the extension arm 112 and is characterized by a field of view 242 directed toward a user, where, as shown in FIG. 3D, that field of view 242 overlaps with the other fields of view 220/222/224/226/150A/150B to collectively define the scan region 106. The front directed imager 240 may be positioned at any suitable location on the extension arm 112. In some examples, a front directed imager is positioned at the distal end of the bottom frame 108. In some examples, the scanner 100 may further include a back directed imager 244, such as an imager at a proximal edge of the bottom frame 108 and having a field of view 246 directed toward the extension arm 112. In some examples, both FsOV 242 and 246 are narrow fields of view, such that both have a width generally confined to a scan region. In other examples, the back directed FOV 246 is narrow, and the front directed FOV 242 is a wide-angle field of view, for example, allowing for coverage that extends beyond the width of the bottom portion 104.

Figure 4A:
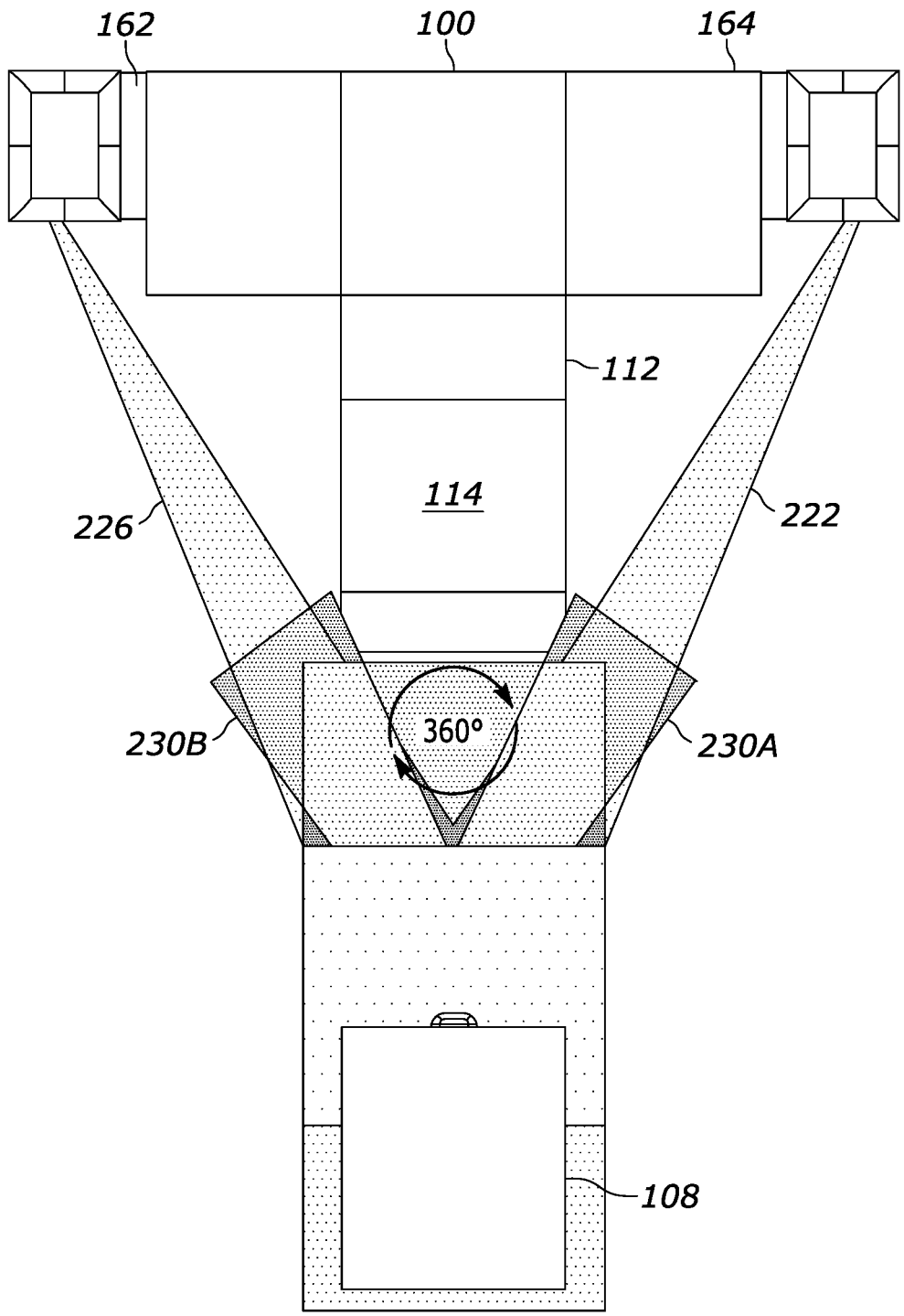
FIGS. 4A, 4B, and 4C are different plan views of the gateway scanner of FIGS. 1A and 1B illustrating a 360° nature of the resulting scan volume.
Figure 4B:
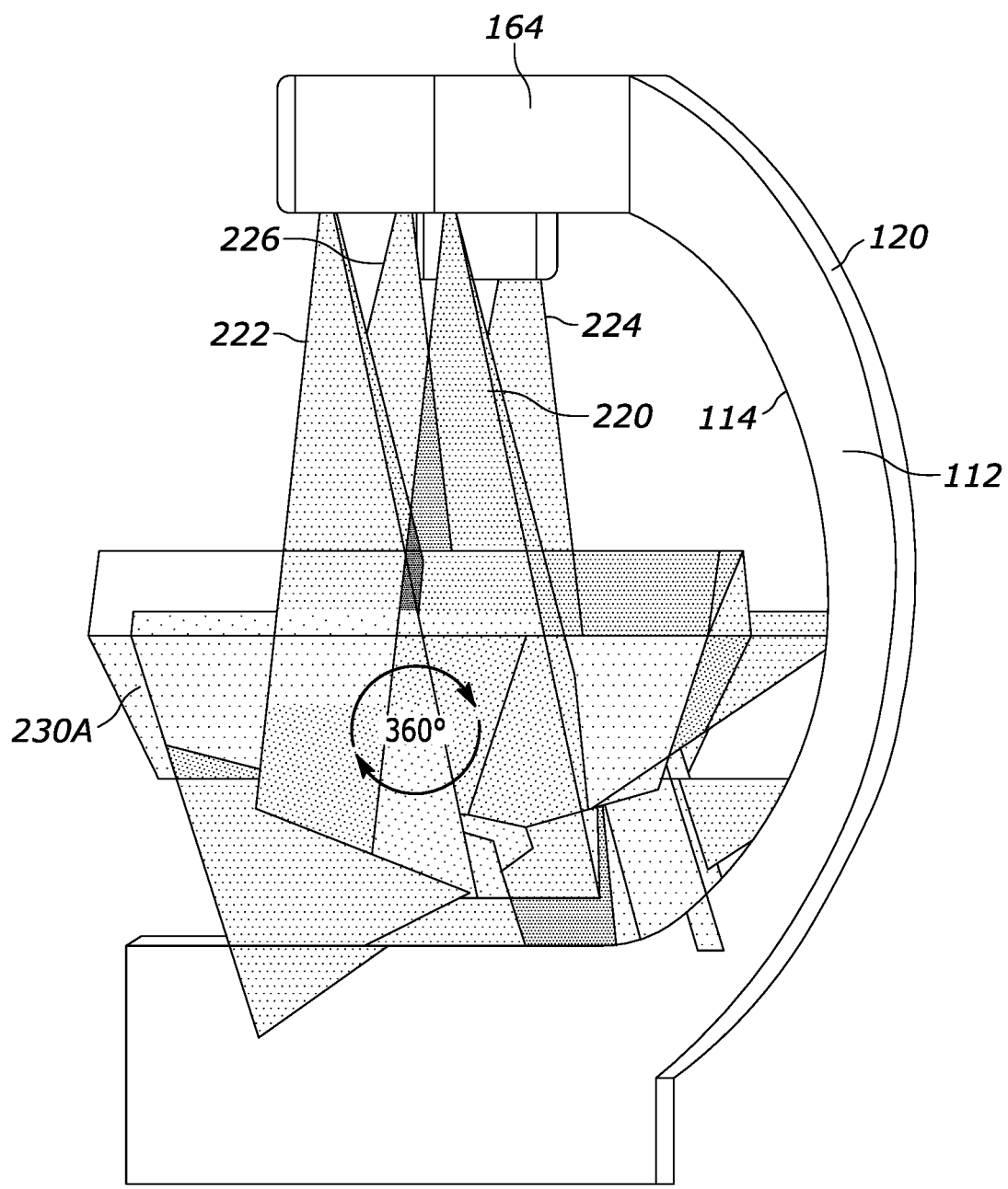
Figure 4C:
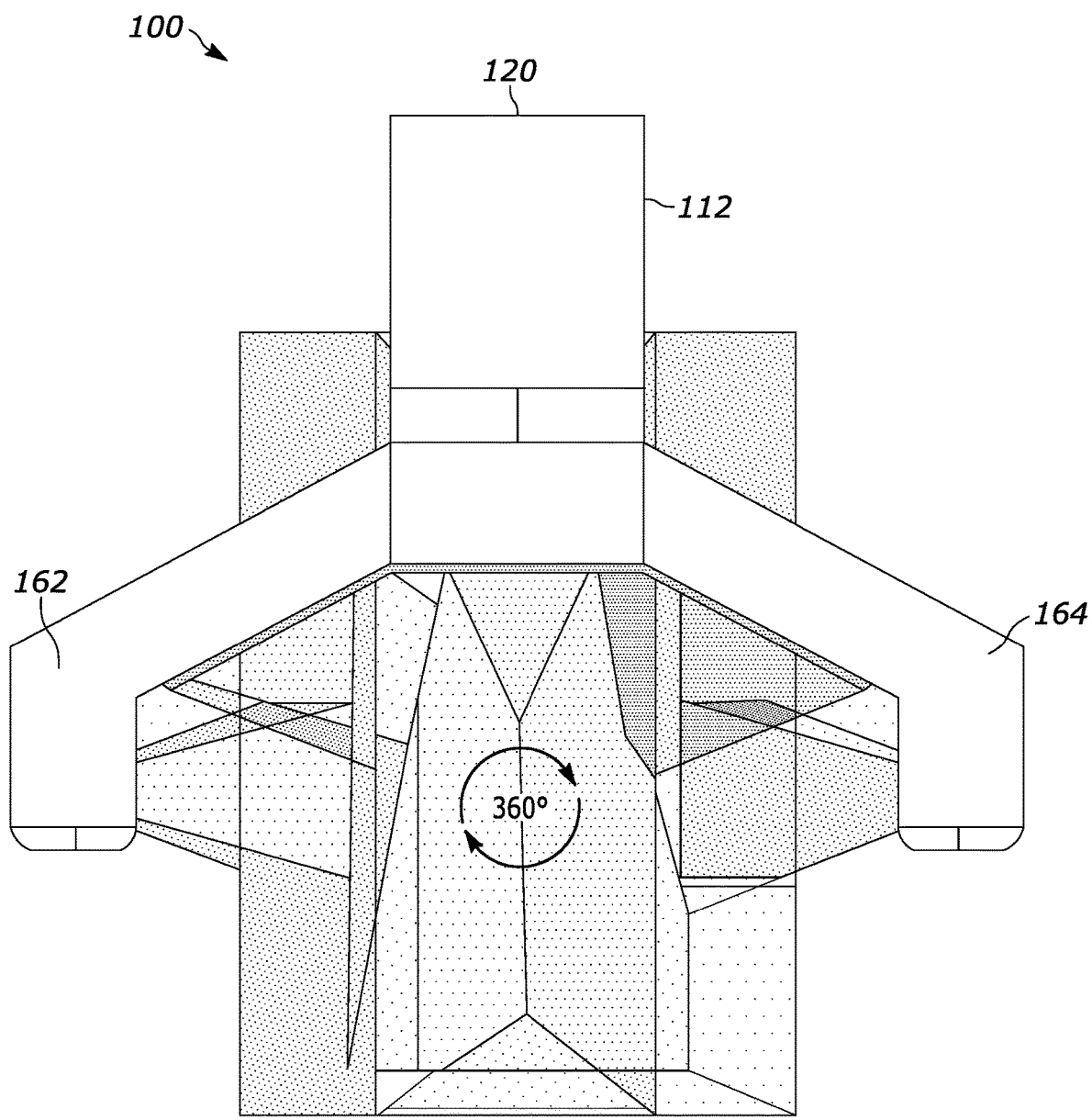

By having overlapping upwardly directed and downwardly directed fields of view and by having at least some of the downwardly directed fields of view angled downward and inward, the scanner 100 is able to achieve orientation independent scanning of indicia of an object, because of the scan volume defined by the overlapping fields of view. FIG. 4A shows an end on view of the scanner 100 indicating full 360° rotational freedom of object scanning in a first vertical plane; FIG. 4B shows a side view indicating full 360° rotational freedom in a second vertical plane; and FIG. 4C shows a top view indicating full 360° rotational freedom in a horizontal plane. FIG. 4A also shows how the FsOV collectively can be kept to a confined region over the lower portion 108, in order to not accidentally read indicia close to but beyond either side of the lower portion 108 before the indicia are passed through a scan region of the scanner 100.

As exemplified in FIGS. 4A-4C, and in other figures, in various examples here, scanner are provided in which a housing (lower portion, upper portion, and extension arm) are configured such that a single scan region has at least one side of free access to a user scanning an object from a lead-in region into a lead-out region. That free access is established by the absence of any physical structure in a natural scanning path of a user.

As further exemplified in FIGS. 4A-4C, and in other figures, scanners are described that may include a plurality of imaging assemblies, each having a field of view, and a housing mounting the plurality of imaging assemblies so that each field of view overlaps with at least one other of the fields of view such that all fields of view collectively form a scan volume. For example, the overlap may be such that the scan volume is able to scan an object over approximately 360 of rotational freedom° about all three orthogonal axes (e.g., cartesian coordinate system). Further, as exemplified the housing may have a lower portion, an upper portion, and an extension arm extending upward from the lower portion to the upper portion, and wherein at least one of the plurality of imaging assemblies is mounted in the upper portion and at least one other of the plurality of imaging assemblies is mounted in the lower portion. Further, as shown that housing may be shaped to form an arc of approximately 180° about the scan volume to provide a user free access to scan objects by passing the objects through the scan volume. To effect this, in some examples, the extension arm has arcuate shape extending from between the upper portion and the lower portion, and wherein an upper edge of the extension arm engaging the upper portion and a lower edge of the extension arm engaging the lower portion lie within a vertical plane.

Figure 5:
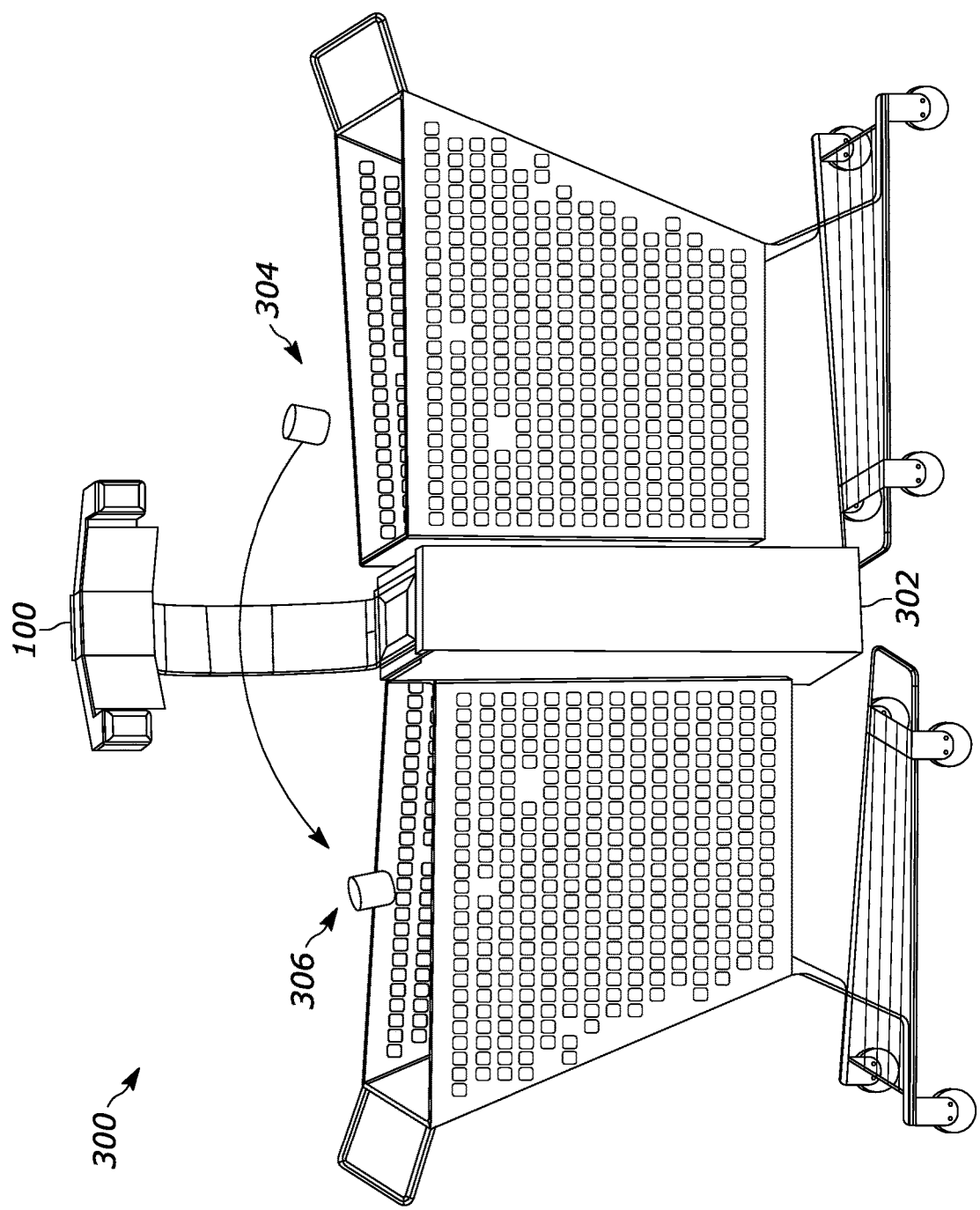
FIG. 5 illustrates a perspective view of the gateway scanner of FIGS. 1A and 1B in another retail environment.

An advantage of gateway scanner configurations such as those of scanner 100 is that they may be adapted into various different self-checkout environments. FIG. 5 illustrates an example of an environment 300 in which the scanner 100 is mounted in an opening of a support structure 302 positioned between two different shopping cart areas 304 and 306, either of which could be a lead-in region or a lead-out region depending which direction a user intends to scan items.

Figure 6:
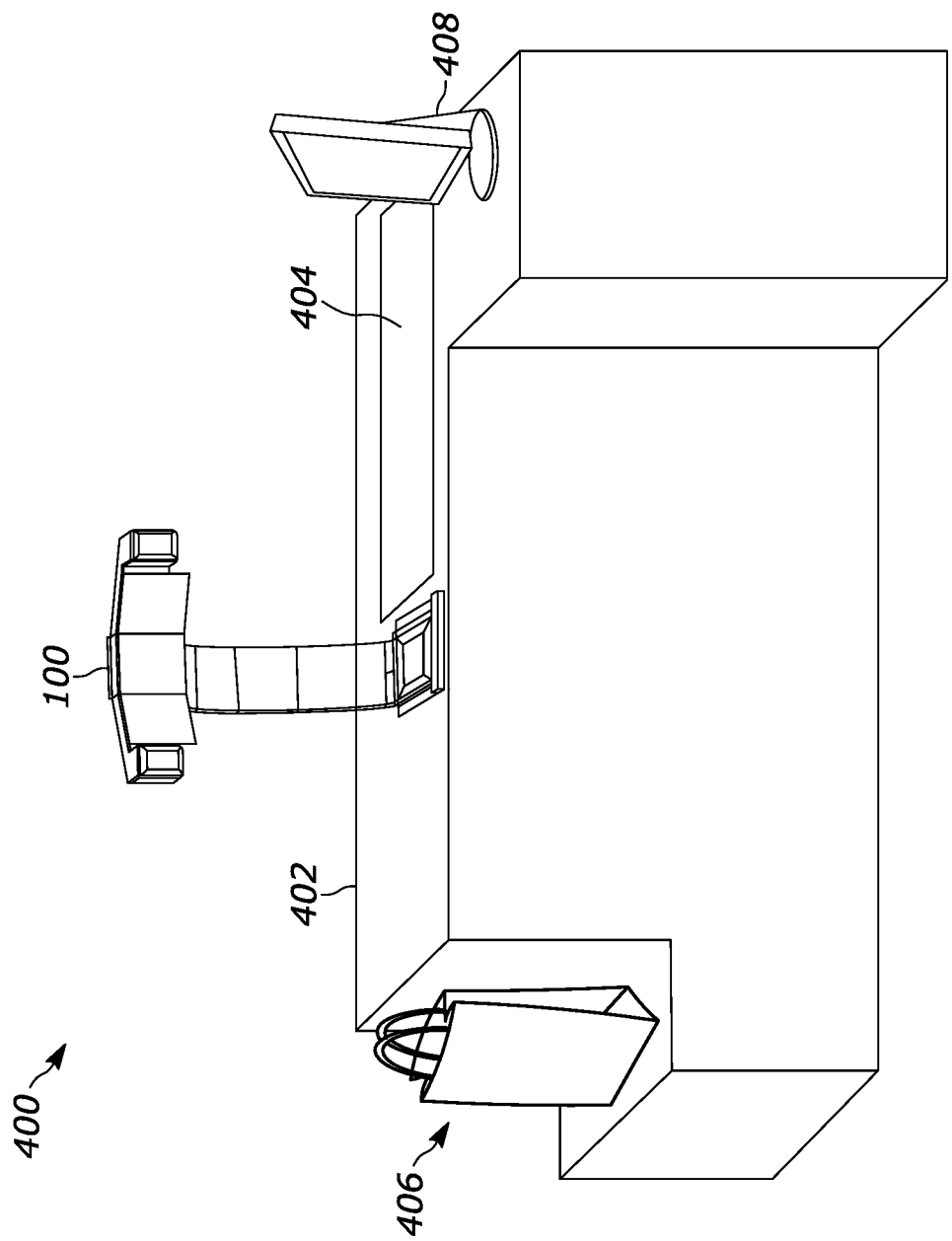
FIG. 6 illustrates a perspective view of the gateway scanner of FIGS. 1A and 1B in self-checkout location of a retail environment having a conveyor system.

FIG. 6 illustrates an example environment 400 in which the scanner 100 is mounted in a scanning conveyer station 400. The station 400 includes the scanner 100 mounted into a station 402 between a conveyor belt assembly 404 at a lead-in side of the scanner 100 and a bagging area 406 downstream. A workstation computer 408 is positioned near an end of the conveyor belt assembly 404 and may be a point of sale computer or other computing device. The environment 400, as shown, may be an employee controller checkout station, for example. Other examples of lead-in and lead-out regions are, of course, possible with the example scanners herein. For example, both the lead-in and lead-out regions may be bagging areas, conveyer areas, roller areas, shopping cart areas, or basket areas. One or both of the lead-in and lead-out regions may be sloped. One or both of the lead-in and lead-out regions may include a weigh scale communicatively coupled to the scanner and/or scanning station to provide weigh data for further facilitating transactions for scanning events. The lead-in and lead-out areas may be any combination of these or other examples herein.

Figure 7:
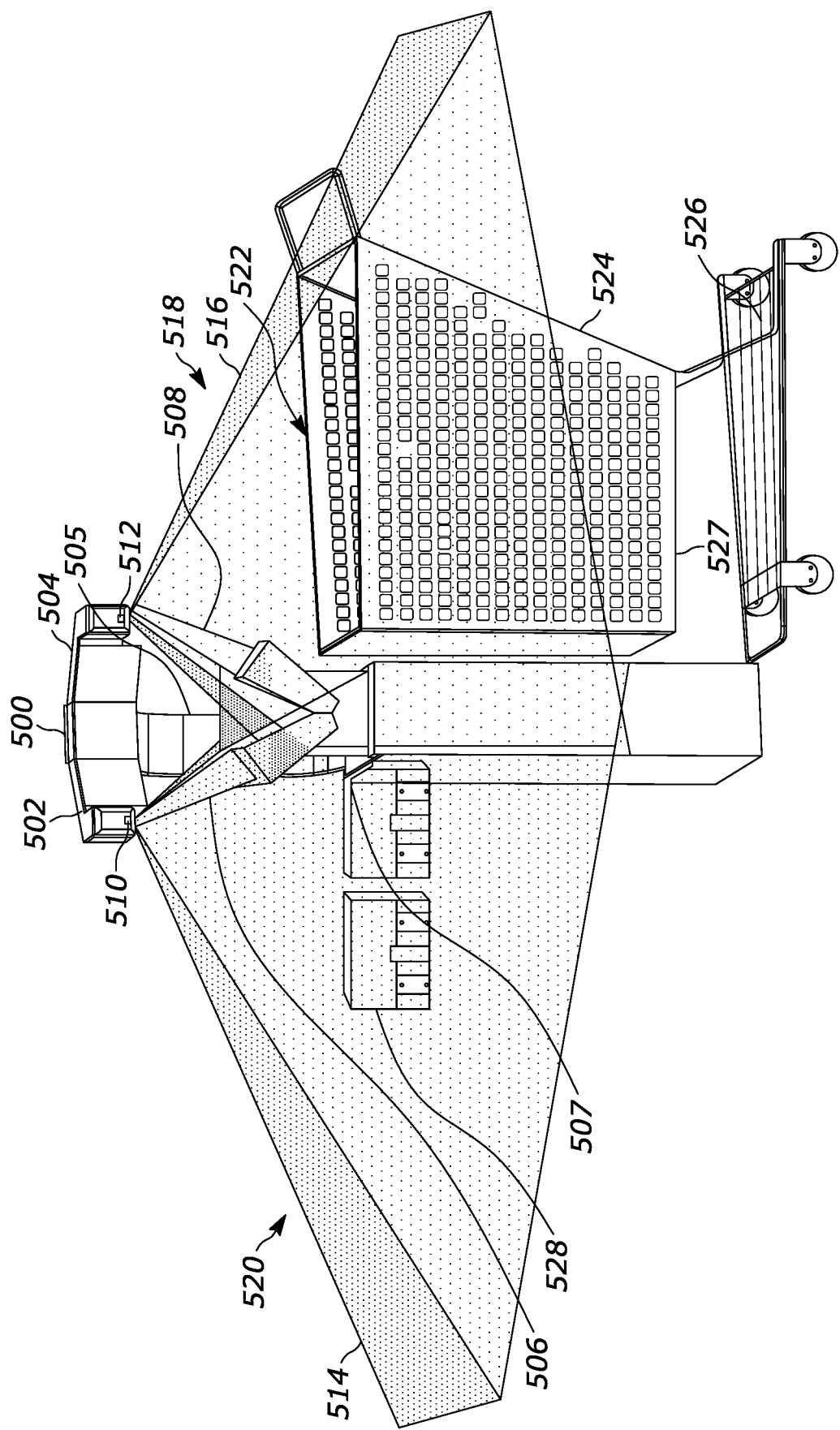
FIG. 7 illustrates a perspective view of an alternative gateway scanner having wide-angle field of view imagers and in self-checkout location of a retail environment.

The gateway scanners herein, in some examples, provide object orientation independent object scanning capabilities while simultaneously providing imaging to monitor one or both of the shopping cart area and the bagging area. FIG. 7, for example, illustrates a scanner 500 having a gateway design similar to scanner 100. The scanner 500 includes branching arms 502 and 504 that each include a downwardly directed imagers (not shown) for scanning an object and identifying indicia in image data capture over respective narrow fields of view 506 and 508. These branching arms 502/504 are connected to an extension arm 505 connected to a bottom portion 507. Additionally, however, the branching arms 502 and 504 include respective wide-angle imagers 510 and 512 each having a wide angle field of view 514 and 516, respectively. These wide-angle imagers 510/512 may be vision cameras, such as 2D color vision cameras, or 3D cameras, such as time of flight cameras. The wide-angle imager 512 captures image data over the field of view 516 that expands to cover lead-in region that is a shopping cart area 518, in the illustrated example.

The wide-angle imager 510 captures image data over the field of view 514 that expands to cover a bagging area 520. In the illustrated example, the field of view 516, allows the imager 512 to capture image data over the entire opening 522 of a standard sized shopping cart 524 properly positioned in the shopping cart area 518 and/or over an entire bottom surface 527 of the shopping cart and/or over the entire under tray 526. In this way, the scanner 500 can capture image data of objects exiting the opening 522, objects within the cart portion of the shopping cart 524, or objects positioned on the under tray 526 of the shopping cart 524.

By contrast, the field of view 514 is wide enough to allow the imager 510 to capture image data over the entire bagging area 520, thereby allowing for capturing image data of objects entering the bagging area, objects entering a bag 528 in the bagging area, etc., such that the opening of the bag 528 and the bottom of the bag 528 may be imaged by capturing image data over the field of view 514.

In the illustrated example, the branching arms 502 and 504 each include two types of imagers, narrow FOV imagers (not shown) generating FOVs 506 and 508, respectively, and wide-angle FOV imagers 510 and 512 generating the FOVs 514 and 516, respectively. In other examples, the branching arms 502 and 504 may each have a single wide-angle imager that generates the FsOV 514 and 516 respectively. In some examples, imaging of the scan region is then performed by processing a portion of the imager sensor that corresponds to the portions of the FsOV 514/516 overlapping the scan region. For example, in such configurations, the FOV 506 may be a portion of the FOV 514 for a single imager, and similarly, the FOV 508 may be a portion of the FOV 516 for a single imager. In yet other examples, the branching arms 502 and 504 may be adjustable to accommodate different sized lead-in and lead-out regions. The adjustability may provide lateral adjustment (across the view of FIG. 7), transverse adjustment (into or out of the view of FIG. 7), or angular adjustments. The adjustments may be to/from fixed predefined positions or angles.

Thus, FIG. 7 illustrates, by example, that various scanners herein provide include an upper portion having an upper imaging assembly with two or more wide-angle fields of view, with a first wide-angle field of view directed to extend over a lead-in region adjacent the scanner and a second wide-angle field of view directed extend over a lead-out region adjacent the scanner. Further, as shown in FIG. 7, these two wide-angle fields of view may overlap (see, region 530) each over define a scan region above an exit window of a bottom portion. In some examples, these downwardly directed wide-angle fields of view overlap with one or more upwardly directed fields from images in a bottom portion, to collectively define that scan region. The amount of overlap defining the region 530 may be determined by the position and/or orientation of the imagers in the branching arms 502/504, for example. Further the fanout angle to the wide-angle field of view may determine the amount of overlap as well. Generally, the scan regions formed in the various scanner examples herein may be formed to allow for indicia identification and/or object recognition for tracking objects across the entire area above a bottom surface or an exit window thereof. Moreover, FIG. 7 illustrates, by way of example, that various scanners here have one or more downwardly directly wide-angle fields view that are positioned to define a continuous field of view, that is one that extends from a far edge of the lead-in region to a far edge of the lead-out region, even where a proximal edge of the first wide-angle field view does not extend into the loud-out region and where a proximal edge the second wide-angle field view does not extend into the lead-in region. That is, herein, a continuous field view describes a combination of fields of view that overlap in such a way so as to capture image data over an entire region. Further continuous review of view may be in reference to a desired of angle of captured image data. For example, two wide-angle fields of view may be combined to form a continuous field of view that allows for scanning a barcode on an object so long as a normal extending from that barcode surface forms an angle over a desired range with a normal to the image sensor surface of the imagers defining the continuous field of view.

Figure 8:
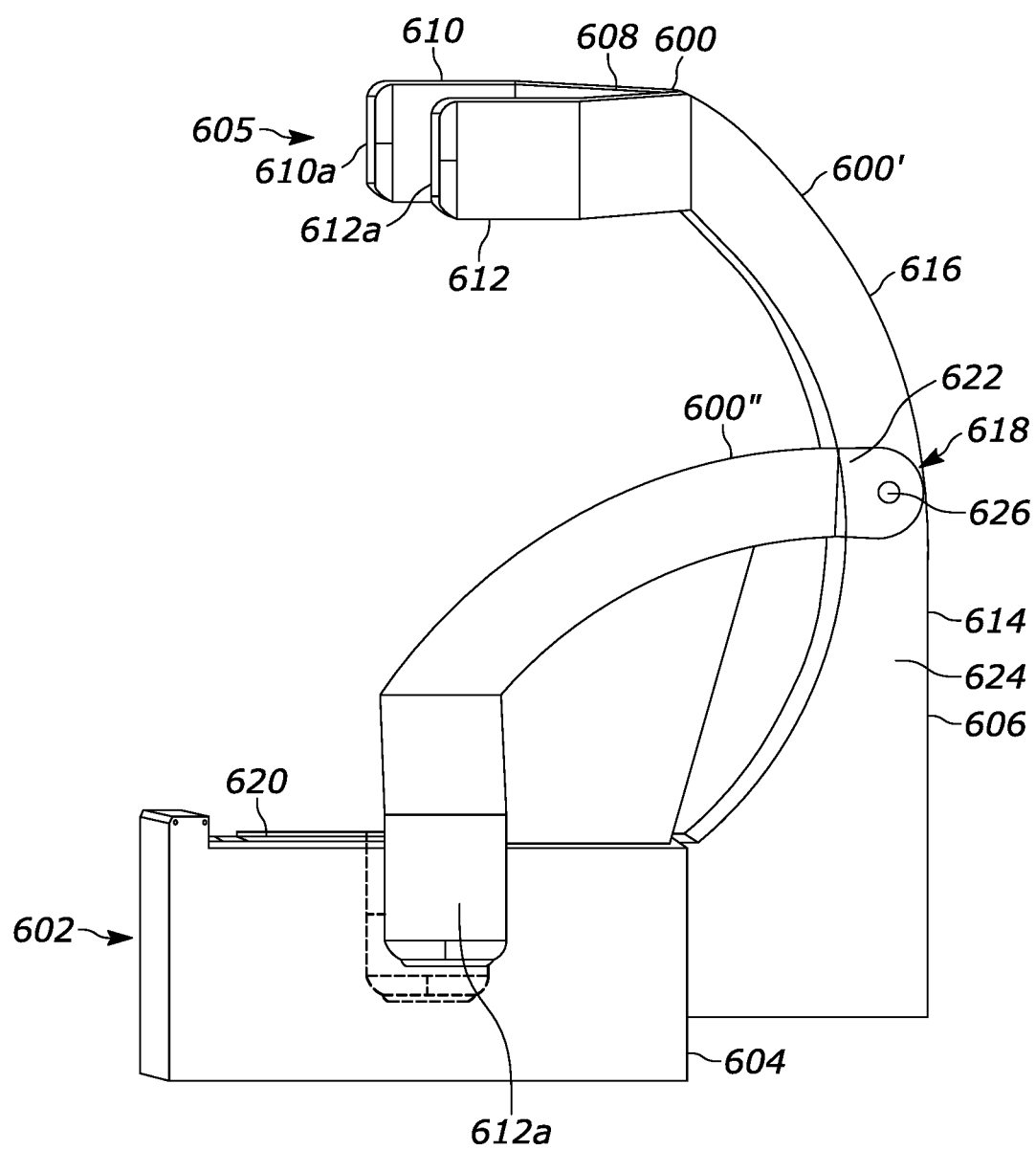
FIG. 8 illustrates a side view of another gateway scanner having a hinge for placing the scanner in a fully-folded position.

In some examples, it may be desirable for to have a gateway scanner that has different deployment positions, such as a fully erected position for object scanning operation and a folded position that prevents objects scanning operation. Depending on the design, the folded position may be one that allows for efficient porting the gateway scanner from one location to another or for taking the scanner offline so that a user is not allowed access to scan region. FIG. 8 illustrates an example configuration of a scanner 600 that has different deployment positions. The scanner 600 includes a lower portion 602 at which a bottom frame 604 containing one or more upwardly directed imagers and optionally a weight platter (neither shown) is provided. An extension arm 606 having an arcuate inner wall configuration extends from the bottom frame 604 to an upper portion 605 having branching mount 608 formed of two branching arms 610 and 612, each having one or more downwardly directed imagers. More particularly, the extension arm 606 is formed of first extension arm segment 614 integrated with the bottom frame 604 and extended therefrom and of a second extension arm segment 616 connected to the first extension arm segment 614 at a hinge 618 and extending from that hinge 618 to the branching mount 608. The hinge 618 is configured to have a first position in which the extension arm segments 614 and 616 are erected to extend upwardly so that the scanner 600 has an erected position (labeled 600') for scanning an object through a scan region. The hinge 618 is further configured to have a second position (labeled 600") in which the argument segment 616 is downwardly rotatable into a fully folded position in which the branching mount 608 is adjacent to an upper surface 620 of the bottom frame 604. In some examples, the branching arms 610 and 612 are sufficiently dimensioned such that end segments 610a and 612a extend at least partially below the upper surface 620, when in the position 600".

The hinge 618 may be implemented in various ways, and in the illustrated example is formed from two leaf members 622 (only one visible) formed on the upper extension arm segment 616 and flush with opposing outer walls 624 (only one visible) of the lower extension arm segment 614, with a pin 626 threaded from one leaf to the other and through a bore hole in the upper extension arm segment 616. Of course, any suitable configuration of hinge may be used. Further, the hinge 618 is configured to have a detent or other engagement that forcibly retains the scanner in the different positions 600' and 600" against movement out of position, without sufficient force from a user.

Figure 9A:
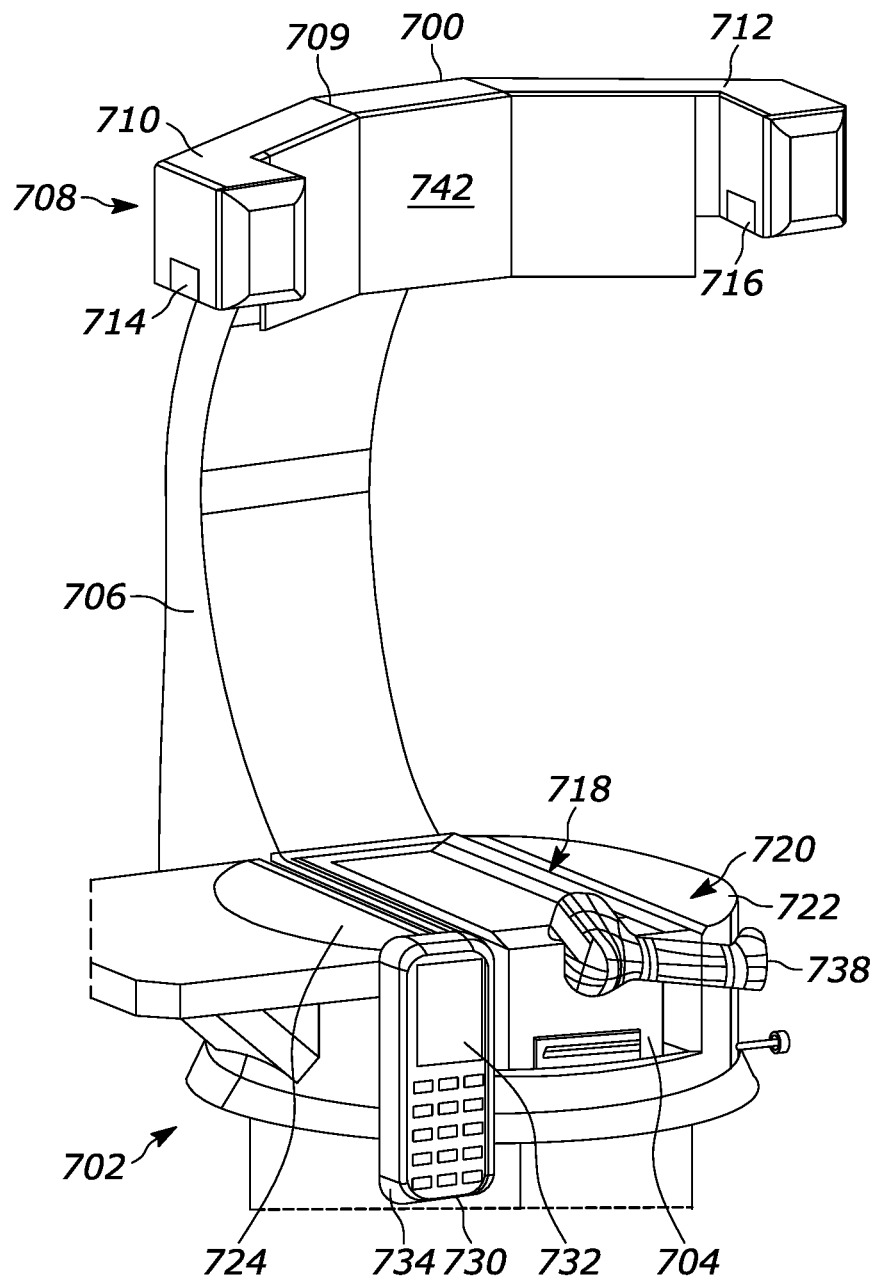
FIGS. 9A, 9B, and 9C are perspective views of another gateway scanner integrated with components forming a scanning station.
Figure 9B:
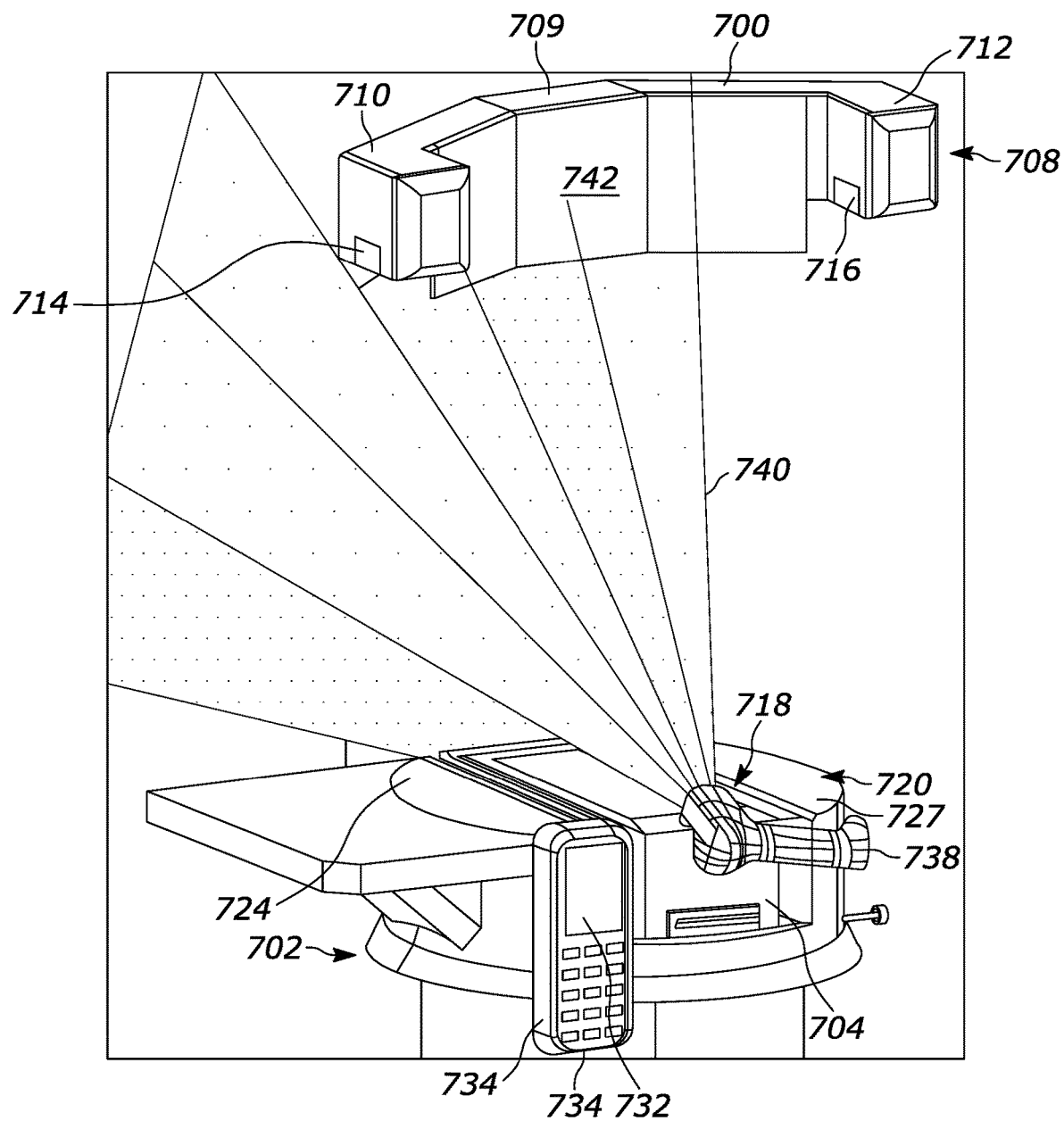

Various gateway scanner examples herein allow for mounting of external components associated with self-check stations, such as user interface terminals. FIGS. 9A and 9B illustrate an example scanner 700 with a lower portion 702 at which a bottom frame 704 containing one or more upwardly directed imagers and optionally a weight platter (neither shown) is provided. An extension arm 706 (shown in FIG. 9A) having an arcuate inner wall configuration extends from the lower portion 702, e.g., from the bottom frame 704, to an upper portion 708 connecting there to at branching mount 709 formed of two branching arms 710 and 712, each having one or more downwardly directed imagers 714 and 716, respectively.

To facilitate integration of a user payment terminal, the bottom frame 704 is recessed in an opening 718 of a support base 720. The opening 718 extends between a platform portion 722 and a platform portion 724 of the base 720. A computer terminal 730 is mounted to the base 720 to display information related to object scanning on a display 732 and to allow user input through a keypad 734 or other input device. In the illustrated example, the computer terminal 730 is a user payment terminal that includes a credit card swipe slot 736 and which may further include a near field communication (NFC) reader embedded therein to allow for contactless payment.

Figure 9C:
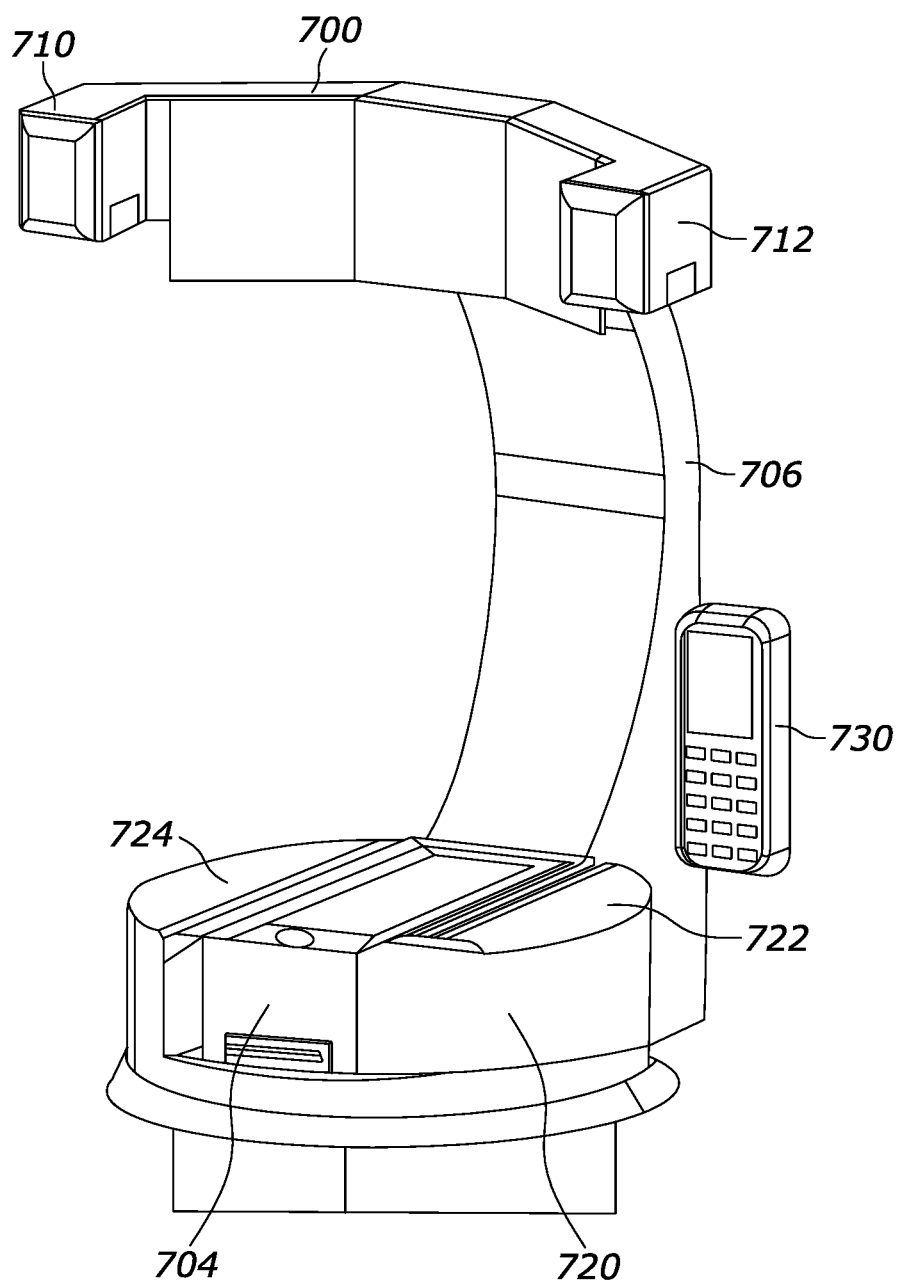

As mentioned, in some examples, the gateway scanners herein may include back directed imagers having a field of view that is directed toward an extension arm. The scanner 700 illustrates an example configuration, in which the back directed imager is contained within a handheld barcode reader 738 that is mounted to the base 720 such that the, as shown in FIG. 9B, a field of view 740 of the barcode reader 738 extends to overlap with a scan volume and which may be angled upward, i.e., having a central axis that forms an acute angle with a horizontal plane coinciding with an upper surface 738 of the bottom frame 704. In the illustrated example, the FOV 740 is limited such that a vertical extent thereof does not impinge upon a digital display 742 of scanner 700. Limiting the vertical extent avoids any infrared reflections off the display in the case of an IR imager, any reflection of an aimer beam or aim pattern in the case of an imager with integrated aimer assembly, or any reflection of visible illumination in the case of an imager with integrated illumination assembly. FIG. 9C illustrates the scanner 700, but with the computer terminal 730 mounted directly to a side of the extension arm 706, for example, to a mount (not shown). In the scanner 700, the external components (e.g., the computer terminal 730 and barcode reader 738 and printer (not shown)) may be mounted with shared data connection. FIG. 9A thus illustrates that in various examples a gateway scanner, in accordance with the present application, may be configured serve as a point-of-sale (POS) host, where a host printed circuit board (PCB) resides anywhere within the gateway housing and is configured handle the interfacing and control for these peripherals mentioned and the overall conduction of the transaction. The host PCB could also provide the vision analysis and indicia decode functions.

Other gateway scanner configurations are contemplated. I The scanner 100 in FIGS. 1A and 1B includes an upper portion with two branching arms, each positioned to both downwardly and inwardly direct imagers thereby allowing full 360° object orientation independent scanning for indicia. However, in other examples, a scanner having two branching arms like scanner 100 may have a single centrally positioned imaging assembly (e.g., mounted in a central area such as the branching mount). The imaging assembly may be a single imager having two fields of view and internal optics within the branching arms that extends each field of view from the central position into each branching arm to form the offset of the two fields of view made to extend downwardly. In other examples, a scanner can an upper portion that has a single extension arm instead of a branching arm. In some examples, an imaging assembly is mounted in the single extension arm and its corresponding imager has two fields of view that extend downwardly and offset from the center normal of a lower portion of the scanner, by an equal and opposite offset distance.

Figure 10A:
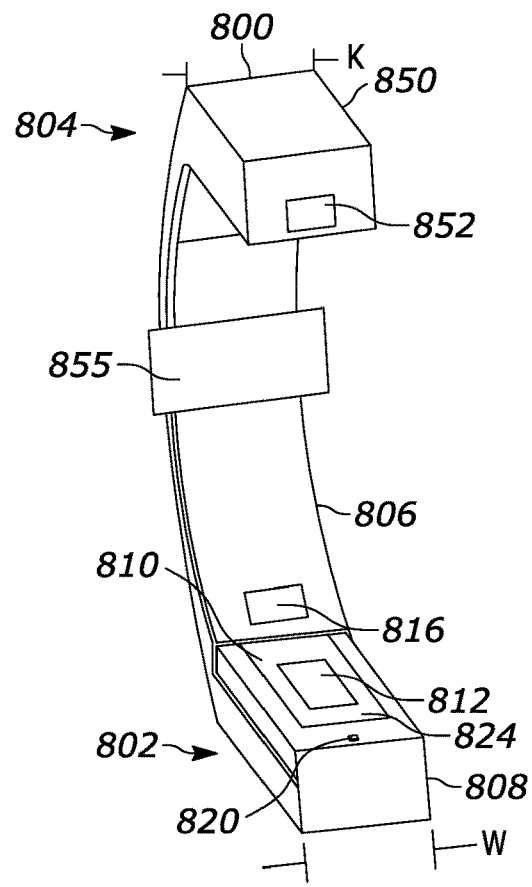
FIGS. 10A and 10B illustrate perspective views of a gateway scanner having a single extension arm.
Figure 10B:
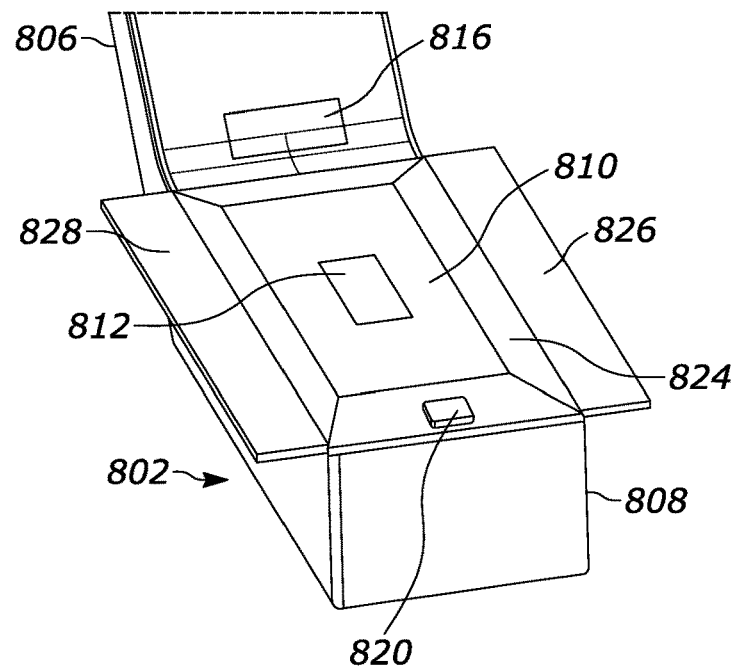
Figure 11A:
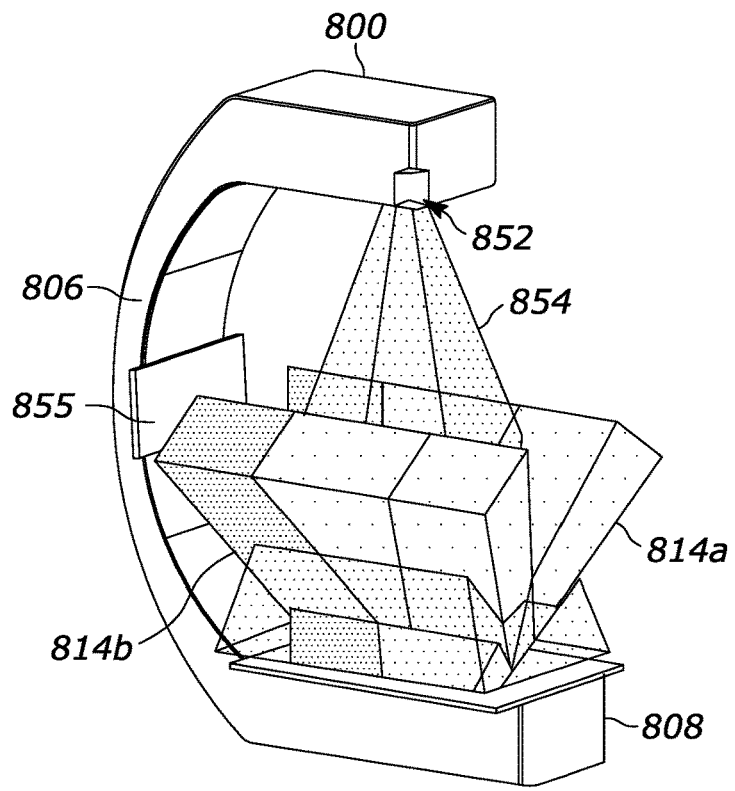
FIGS. 11A and 11B are perspective views of the gateway scanner of FIGS. 10A and 10B illustrating different imager fields of view.

FIGS. 10A and 10B illustrate a narrower scanner design having a single upper portion imager mount. In the exampled example, a scanner 800 includes a lower portion 802, an upper portion 804, and an extension arm 806 extending between the two. The lower portion 802 includes a bottom frame 808 having an exit window 810 and at least one internally mounted upwardly directed imager 812 having a field of view 814 (shown in FIG. 11A). In the illustrated example, an internal mirror (not shown) within the frame 808 is positioned to form the field of view 814 as a split field of view formed of halves 814A and 814B, where each half corresponds to a different portion of the imager array. This configuration allows for using a single upwardly directed imager with a wider field of view.

Figure 11B:
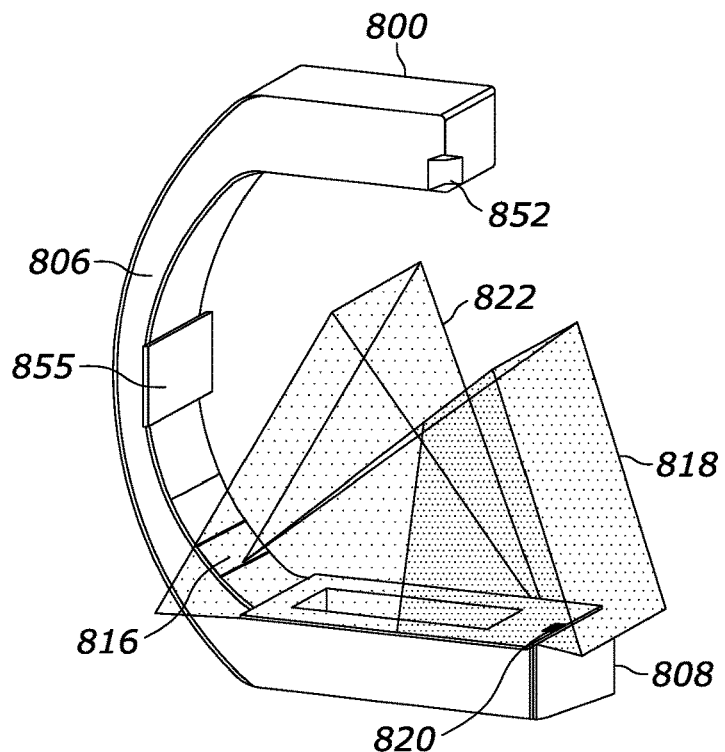

In an example, in a lower portion of the extension arm 806, a forward directed imager 816 is housed having a field of view facing the location of a user. For example, the imager 816 may be a wide-angle 2D camera for capturing image data of the user during object scanning over a wide-angle field of view 818 (only a central portion of which is shown in FIG. 11B). The imager 816 is mounted adjacent a distal end of the bottom frame 808, while a backward directed imager 820 is mounted in the frame 808 at a proximal end and may have a narrow field of view 822 directed toward the extension arm 806 and overlapping with the field of view 818 coinciding with a scan volume.

The bottom frame 808 houses a weigh platter 824 positioned to measure the weight of objects resting on the exit window 810 or on a transparent, protective screen above the exit window. Additionally, the bottom frame 808 includes two adjustable platter wings 826 and 828 on opposite sides of the bottom frame 808 and extending the length thereof. The platter wings 826 may be adjustable between a deployed position (see, FIG. 10B) and a fully folded position (see, FIG. 10A) in which they are folded flush with outer walls 830 and 832, respectively, of the frame 808. In the deployed position, the platter wings 826/828 provide extended entrance and exit surfaces leading into the scan region coinciding with the exit window 810. In some examples, the exit window 810 is recessed below the height of these platter wings when deployed. Such a bottom frame configuration may be employed in any of the example scanners described herein. In some examples, the platter wings 826/828 may be angled upwardly and/or the platter wings 826/828 may have raised ridges on outer edges so as to create a concave region for the weigh platter 824, so items like produce do not roll off. Of course, in some examples, the outer edges of the bottom surface 808 may be flanged inwardly to create such a concave region.

To provide a narrow profile over the entire vertical extent of the scanner 800, the upper portion 804 includes a single extension arm 850 serving as a mount, instead of a mount feeding two branching arms. In an example, the extension arm 850 mounts one or more downwardly directed imagers 852 having a narrow field of view 854 (shown in FIG. 11A) forming a scan volume with the field of view 814 and the optional fields of view 818 and 822. The scanner 800 is further configured to include a digital display 855 positioned at an interior of the extension arm 806. While not limited to such, the lateral width, K, of the extension arm 850 may be equal to or less than the width, W, of the lower portion 802, such that the upper portion 804 has a width equal to or less than the width of the lower portion 802.

Figure 12:
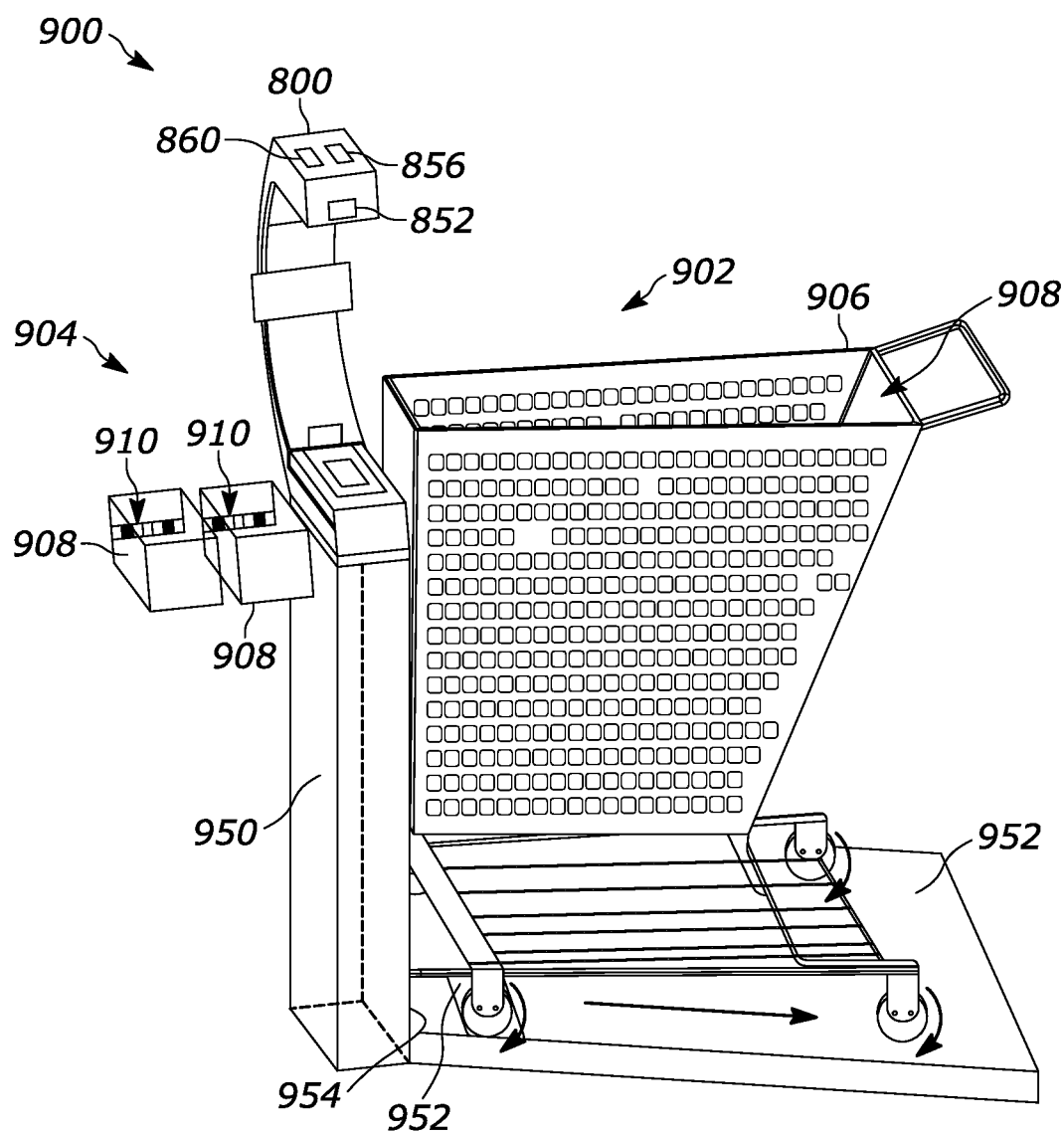
FIG. 12 illustrates a perspective view of the gateway scanner of FIGS. 10A and 10B in a retail environment.
Figure 13:
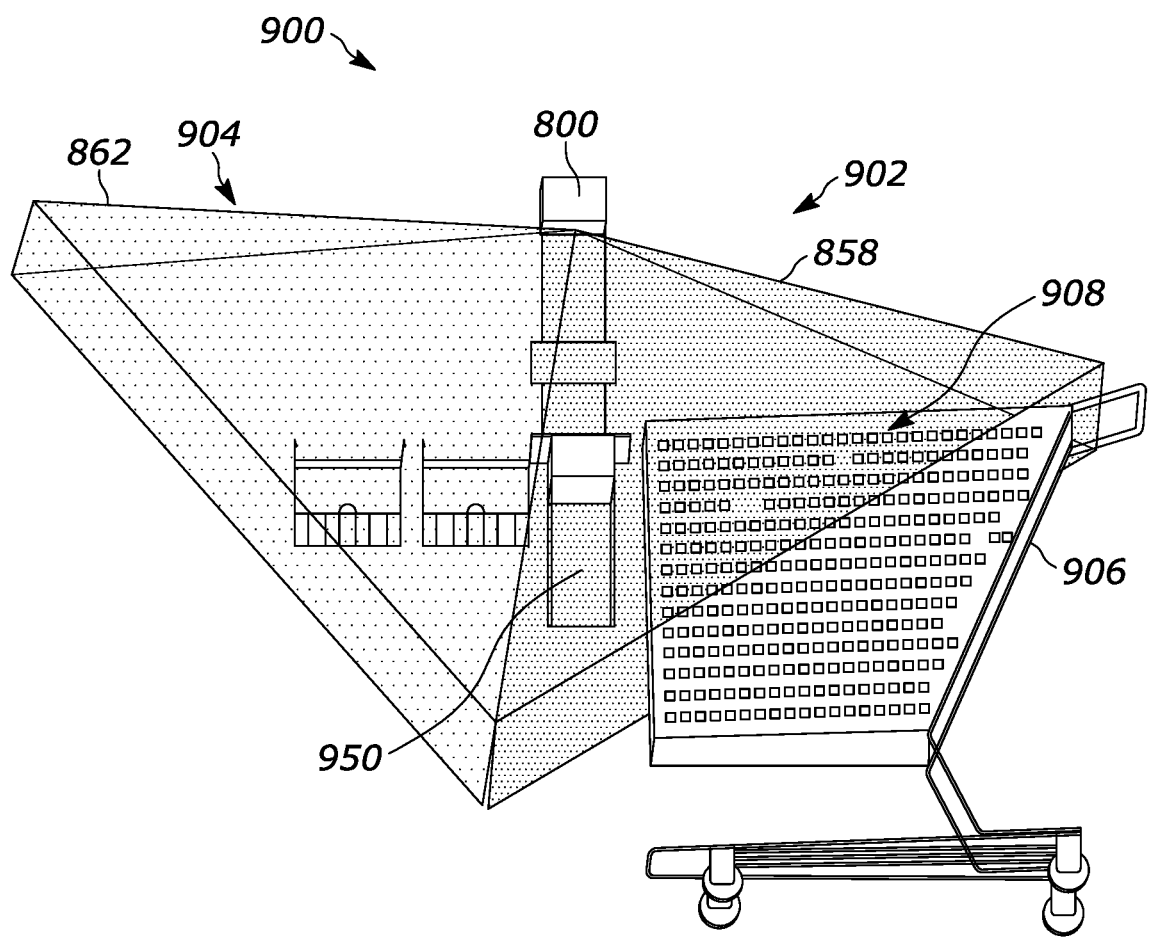
FIG. 13 illustrates a perspective view of an alternative gateway scanner having a single extension arm and having wide-angle field of view imagers and in self-checkout location of a retail environment.

As with the scanner 100, the scanner 800 may be positioned in a self-checkout location 900 (shown in FIG. 12) positioned on a support structure 950 between a shopping cart area 902 and a bagging area 904. As a user moves objects from a shopping cart 906, through the scan volume of the scanner 800, and to bags 908, the scanner 800 scans the object collecting image data from each of the imagers, identifying indicia on the object, for decoding. To facilitate capture of image data over the shopping cart area 902 and the bagging area 904, the branching arm mount 850 may include one or more wide angle imagers, in some implementations. In the illustrated example of FIGS. 12 and 13, a wide-angle imager 856, such as a 2D camera, is positioned within the mount 850 and has field of view 858 that encompasses at least a portion of the shopping cart area 902 and preferably is sufficiently sized to capture image data over the entire opening 908 of the shopping cart 906. Correspondingly, a second imager 860, such as a 2D camera, is positioned within the mount 850 and has a field of view 862 that encompasses at least a portion of the bagging area 904 and preferably is sufficiently sized to capture image data over openings 910 of bags 908 therein. Thus, in some examples, a scanner may be configured to have wide-angle imagers that have wide-angle fields of view that overlap over a scan region (such as shown in FIG. 7) to define a scan volume or combine with other fields of view to define a scan volume, while in other examples (such as shown in FIGS. 12 and 13) the wide-angle fields of view may be directed to (or aperture limited to) extend over respective lead-in or lead-out regions only. Such variations are applicable to any of the wide-angle imager based scanners herein.

In some examples, the support structure 950 includes a shopping cart retaining structure 952 in the form of an integrated ramp platform, in the illustrated example. The retaining structure 952 have may a detent for retaining wheels 912 of the shopping cart 906 in place against moveout out of the shopping cart area 902. The structure 952 may be a bump for positioning under or behind a front wheel of a shopping cart, an electromagnet, a hook, etc. In some examples, the retaining structure may be positioned in a side of a support structure 954, for example an electromagnet or hook.

Further, the support structure 950 may include a trigger assembly communicatively coupled to the scanner 800 to initiate wakeup of the scanner in response to the trigger assembly detecting the presence of the shopping cart 906 in a proper position in the lead-in region (i.e., the shopping cart area 902). That trigger assembly may be, for example, a mechanical push button (not shown) in a detent portion 956 of the retaining structure 952 or extending from a side wall 954 thereof. In yet other examples, an electrical trigger assembly (e.g., an FRID reader, etc.—not shown) or an optical trigger assembly (e.g., an infrared imager, vision camera, barcode reader, etc.—not shown) may be positioned at the side wall 954 for optically detecting the presence an edge of the shopping cart 906. In some examples, a wide-angle field of view of a scanner may be used to detect the presence of a shopping cart. The trigger assembly is an example of a detection assembly. In other examples, the detection assembly may be a downwardly directed looking vision camera assembly, an infrared (IR) sensor assembly, a capacitive sensor assembly, an inductive sensor assembly, or a magnetic sensor assembly.

FIG. 9 illustrates that the present includes narrow scanning stations, whether configured with a scanner like of FIGS. 1, 2, 8, 9A-9C, 10A-14, or any other scanners describe herein, that include a lead-in region for positioning a shopping cart of objects prior to scanning and a lead-out region for storing objects after scanning and a substantially horizontal scanning surface extending fully between an edge of the lead-in region and an edge of the lead-out region. These scanning stations include a scanner positioned between the lead-in region and the lead-out region for scanning the objects from the shopping cart received from the lead-in region, the scanner defining greater than approximately 75% of the substantially horizontal scanning surface. Any of the scanners herein may be positioned as such, including for example a scanner having a plurality of imaging assemblies, each having a field of view, and a housing mounting the plurality of imaging assemblies so that each field of view overlaps with at least one other of the fields of view such that all fields of view collectively form a scan volume. Further the scanning stations may include, among other things, a detection assembly positioned relative to the substantially horizontal scanning surface to detect that the shopping cart is in a correct location in the lead-in region for effecting the transaction.

Figure 14:
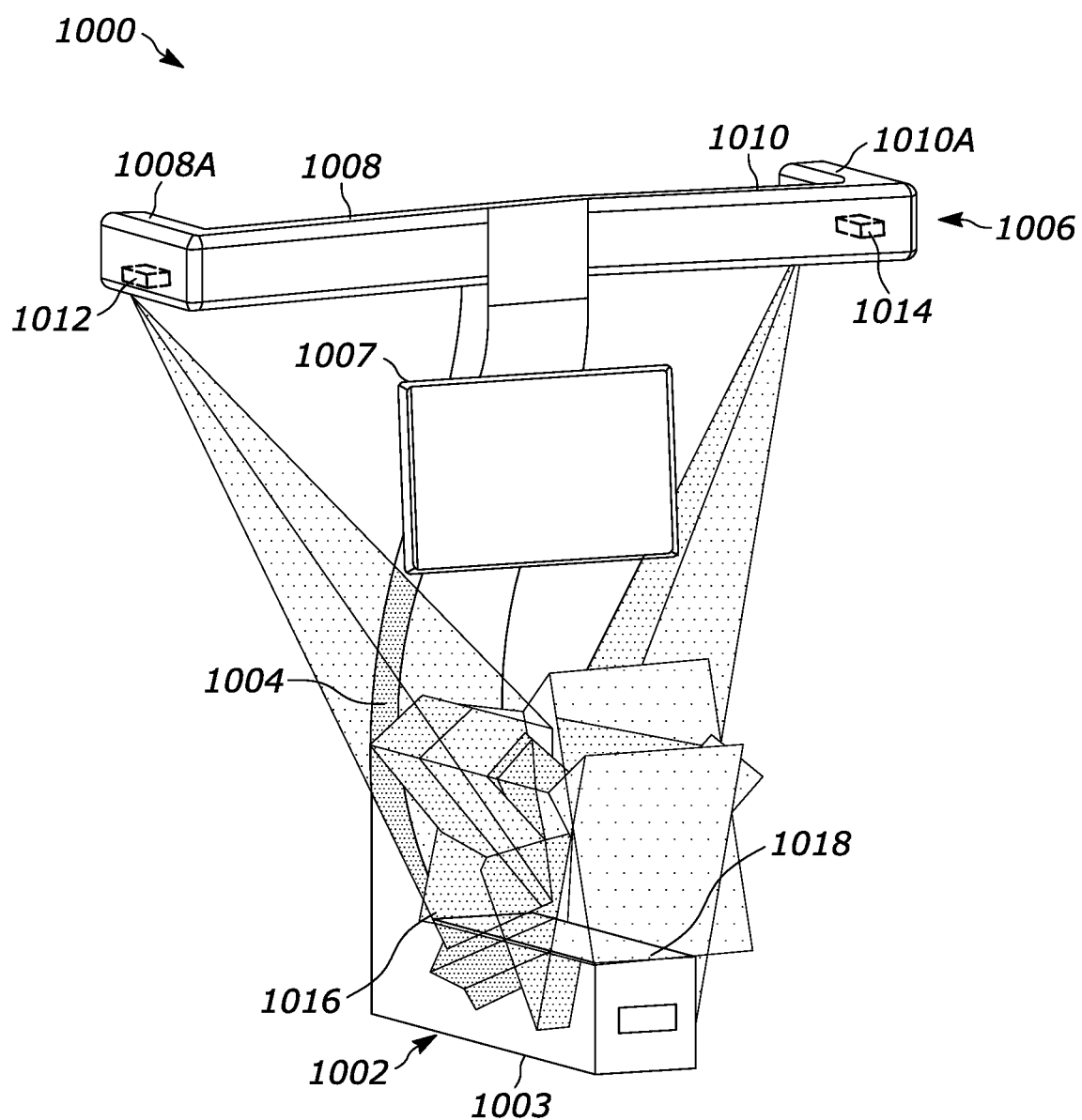
FIG. 14 illustrates a perspective view of another gateway scanner with two branching arms.

FIG. 14 illustrates another example gateway scanner configuration. A scanner 1000 includes a lower portion 1002 having mounted therein a lower imaging assembly (not shown), exit window (not shown), optionally a weigh platter (not shown), optionally a backward directed imager (not shown), and optionally a forward directed imager (not shown), along with corresponding FsoV (shown). An extension arm 1004 extends from a frame 1003 of the lower portion 1002 to an upper portion 1006 and may include a display screen 1007. The upper portion 1006 includes branching arms 1008 and 1010 with reward extending arm segments 1008A and 1010A, respectively. In this configuration, the extension arm 1004, the upper portion 1006, the branching arms 1008/1010, and/or the arm segments 1008/1010A are configured so that at respective downwardly directed imaging assemblies 1012 and 1014 are positioned reward of a distal edge 1016 of the exit window (or a distal edge of the upper surface of the lower portion 1002), when looking downward from a plan view. The distal edge 1016 is opposite a proximal edge 1018 nearest a user.

It will be appreciated that gateway scanners herein may be characterized as having various features. Scanners may have an extension arm having mounted thereto or therein a forward directed imaging assembly to capture images over a field of view generally directed at the user. For example, an exit window may be at an interior surface of the extension arm with the field of view extending, therefrom. that exit window may be vertically taller than horizontally wide. For example, the vertical length to horizontal width ratio of the exit window in the extension arm may be at least 2:1 or more preferably at least 3:1. The upper portion of the scanner may position the imaging assemblies forward of a rear edge of an exit window in a bottom (platform) portion. The upper portion may be configured to support one or more additional peripherals aside from the imagers. The scanners may have additional horizontal surfaces extending from the bottom portion to level or ramp the upper surface of the bottom portion with external surfaces at a checkout station. The scanners may have upper portions that physically position vision cameras (or position their fields of view) to be above a shopping cart area and above bagging area, respectively, when viewed from above. The scanners may have both one or more vision cameras and one or more barcode imagers attached to the same support, whether a central part of the upper portion, branching arms of the upper portion, or elsewhere. Scanners may have an upper portion that extends at least partially to the left and right of a bottom portion, exit window of the bottom portion, and/or weigh platter. For barcode scanner, the FsOV may be constrained in order to not read items substantially beyond a scan region defined by the lower portion width up to a certain height, e.g., 5" above the exit window of the lower portion.

It will be appreciated that the gateway scanners herein may be used in various methods. For example, the gateway scanners may be used in a method of scanning products, where a product carrier is positioned at one side of a scanner and where a bagging area is positioned at the other side of a scanner and wherein the distance between the product carrier and the bagging area is no more than 15 inches (e.g., from between 10 inches and 15 inches) and wherein the scanner partially surrounds a vertical plane between the product carrier and the bagging area, the vertical plane being positioned such that an object being moved between the product carrier and bagging area must past through it, and wherein the scanner is configured to capture indicia positioned on any side of an object moving through the vertical plane.

More generally, gateway scanners herein may, in various examples, have multiple imagers contained within a support structure that includes an opening on the user side to facilitate the passage of items and a lower portion that includes horizontal exit windows, behind which cameras are positioned. That support structure further includes an extension arm above the horizontal windows in order to allow the passage of larger items. These multiple imagers may be positioned so that indicia may be captured on any side of an object within a scan volume contained within an open volume created by the support structure. Further upward directed imagers and the downward directed imagers may be sufficiently tilted to achieve enough resolution to read indicia on the leading and trailing sides of an object being passed through the scan volume.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A scanner comprising:
   a housing having a lower portion, an upper portion, and an extension arm extending upward from the lower portion to the upper portion;
   the lower portion having an exit window and a lower imaging assembly mounted in the lower portion below the exit window and having at least one field of view directed upwardly through the exit window; and
   the upper portion having an upper imaging assembly mounted in the upper portion and having two fields of view, wherein the upper portion is configured such that the two fields of view extend downwardly toward the lower portion with each field of view positioned to have a central axis that is offset with respect to a center normal of the exit window,
   wherein the upper portion comprises two branching arms extending in opposing lateral directions away from a center region where the upper portion is supported by the extension arm.

2. The scanner of claim 1, wherein the upper imaging assembly comprises a centrally positioned imager and wherein the two fields of view of the upper imaging assembly each extend from the centrally positioned imager into each branching arm respectively such that the two fields of view are offset from the center normal of the exit window by an equal and opposite offset distance.

3. The scanner of claim 2, wherein the offset distance is greater than half a lateral width of the lower portion.

4. The scanner of claim 1, wherein the upper imaging assembly comprises two imagers each mounted in a respective one of the two branching arms such that the two fields of view of the upper imaging assembly are offset from the center normal of the exit window by an equal and opposite offset distance.

5. The scanner of claim 4, wherein the offset distance is greater than half a lateral width of the lower portion.

6. The scanner of claim 1, wherein the upper portion is configured such that the two fields of view extend downwardly toward the lower portion which each central axis obliquely angled with respect to the center normal of the exit window, the two central axes being obliquely angled by equal and opposite angles.

7. The scanner of claim 1, wherein the upper imaging assembly comprises a centrally positioned imager, and wherein the two fields of view of the upper imaging assembly extend downwardly such that the two fields of view are offset from the center normal of the exit window by an equal and opposite offset distance.

8. The scanner of claim 1, wherein the upper imaging assembly comprises at least one wide-angle imager having a wide-angle field of view, and wherein the two fields of view of the upper imaging assembly correspond to portions of the wide-angle field of view.

9. The scanner of claim 8, wherein the wide-angle field of view coincides with at least one of a lead-out region adjacent to the scanner or a lead-in region adjacent to the scanner.

10. The scanner of claim 1, wherein the upper imaging assembly comprises two wide-angle imagers each having a respective wide-angle field of view, wherein one of the two wide-angle imagers is positioned such that a respective wide-angle field of view of the one of the two wide-angle imagers is to coincide with a lead-in region adjacent the scanner and wherein the other of the two wide-angle imagers is positioned such that a respective field of view of the other of the two wide-angle imagers is to coincide with a lead-out region adjacent the scanner.

11. The scanner of claim 10, wherein each wide-angle imager is mounted in a respective one of the two branching arms.

12. The scanner of claim 1, wherein a ratio of a vertical height of the scanner to a lateral width of the lower portion of the scanner is at least 2:1.

13. The scanner of claim 12, wherein the lateral width of the lower portion is between 7 inches and 12 inches.

14. The scanner of claim 12, wherein the vertical height of the scanner is between 15 inches and 30 inches.

15. The scanner of claim 1, further comprising a display screen mounted to the extension arm or mounted to the upper portion.

16. The scanner of claim 1, wherein the lower portion further comprises a weigh platter positioned to weigh items resting on the exit window.

17. The scanner of claim 1, wherein the exit window is recessed in the lower portion.

18. The scanner of claim 1, wherein the lower portion includes one or more adjustable extension wings, at least one of which extends toward a lead-in region adjacent the scanner or toward a lead-out region adjacent the scanner.

19. The scanner of claim 1, wherein the lower imaging assembly comprises a plurality of imagers each having a respective field of view directed upwardly through the exit window.

20. The scanner of claim 1, further comprising a hinge in the extension arm, the hinge being configured to rotate an upper portion of the extension arm such that the upper portion of the scanner is placed into a stored position adjacent to the lower portion of the scanner.

21. The scanner of claim 1, further comprising a wide-angle imager mounted in the housing recessed distally from a front edge of the lower portion closest to a user positioned for scanning objects using the scanner, the wide-angle imager mounted to define a wide-angle field of view extending upwardly and directed toward a user positioned for scanning objects from a lead-in region to a lead-out region.

22. The scanner of claim 21, wherein the wide-angle imager is mounted in the extension arm of the housing.

23. The scanner of claim 1, wherein each branching arm is collapsible into a stored position relative to the center region.

24. The scanner of claim 1, wherein each branching arm is removable from the upper portion.

25. The scanner of claim 1, further comprising an illumination assembly mounted in the upper portion and positioned to generate an illumination downward toward the exit window.

26. The scanner of claim 25, further comprising a baffle positioned to confine the illumination from extending beyond an outer boundary of the lower portion.

* * * * *